United States Patent
Coonrod et al.

(10) Patent No.: US 9,163,471 B2
(45) Date of Patent: Oct. 20, 2015

(54) POSITION MONITORING SYSTEM AND METHOD

(75) Inventors: Donald Scott Coonrod, Katy, TX (US); Emanuel John Gottlieb, Pittsburgh, PA (US); Donald Roy Augenstein, Pittsburgh, PA (US)

(73) Assignee: Cameron International Corporation, Houston, TX (US)

( * ) Notice: Subject to any disclaimer, the term of this patent is extended or adjusted under 35 U.S.C. 154(b) by 446 days.

(21) Appl. No.: 13/457,810

(22) Filed: Apr. 27, 2012

(65) Prior Publication Data
US 2013/0283919 A1 Oct. 31, 2013

(51) Int. Cl.
| | |
|---|---|
| G01N 29/00 | (2006.01) |
| E21B 33/06 | (2006.01) |
| E21B 33/035 | (2006.01) |
| E21B 47/09 | (2012.01) |

(52) U.S. Cl.
CPC ............. E21B 33/06 (2013.01); E21B 33/0355 (2013.01); E21B 47/091 (2013.01)

(58) Field of Classification Search
CPC .... E21B 33/0355; E21B 33/06; E21B 47/091
USPC ........................ 73/597, 602; 374/185, E7.018
See application file for complete search history.

(56) References Cited

U.S. PATENT DOCUMENTS

| | | | |
|---|---|---|---|
| 2,802,196 A * | 8/1957 | Fry et al. ........................ | 367/162 |
| 3,510,698 A * | 5/1970 | Massa ............................ | 310/330 |
| 3,952,216 A * | 4/1976 | Madison et al. ............... | 310/325 |
| 4,543,649 A | 9/1985 | Head et al. | |
| 4,922,423 A | 5/1990 | Koomey et al. | |
| 5,025,708 A | 6/1991 | Smith et al. | |
| 5,164,548 A | 11/1992 | Angehrn | |
| 5,407,172 A | 4/1995 | Young et al. | |
| 5,552,222 A * | 9/1996 | Bolon et al. ................... | 428/379 |
| 5,727,442 A | 3/1998 | Wimmer | |
| 6,037,703 A * | 3/2000 | Kambe et al. .................. | 310/338 |
| 6,446,494 B2 | 9/2002 | Hastings et al. | |
| 6,478,087 B2 | 11/2002 | Allen | |
| 6,578,421 B1 * | 6/2003 | Ishikawa et al. ........... | 73/514.34 |
| 6,675,111 B2 | 1/2004 | Komatsu et al. | |
| 6,708,570 B2 | 3/2004 | Matsushima et al. | |
| 6,860,327 B2 | 3/2005 | George | |

(Continued)

OTHER PUBLICATIONS

Wilson, Wayne D., Speed of Sound in Distilled Water as a Function of Temperature and Pressure, The Journal of the Acoustical Society of America, Aug. 1959, pp. 1067-1072, vol. 31, No. 8.

(Continued)

*Primary Examiner* — J M Saint Surin
(74) *Attorney, Agent, or Firm* — Eubanks PLLC

(57) ABSTRACT

An ultrasonic position sensing system is disclosed. In one embodiment, the system includes an ultrasonic sensor configured to monitor the position of a device. The system also includes ranging logic. The sensor is controlled by the logic to direct an ultrasonic pulse toward the device. The logic is configured to compute the transit time and the velocity of the ultrasonic pulse. Based on these parameters, the logic computes the path length between the sensor and the device, which corresponds to the location of the device relative to the location of the sensor. In further embodiments, the ultrasonic positioning system may include multiple sensors in communication with the ranging logic for monitoring multiple devices.

13 Claims, 14 Drawing Sheets

(56) References Cited

U.S. PATENT DOCUMENTS

| | | |
|---|---|---|
| 7,300,033 B1 | 11/2007 | Whitby et al. |
| 7,832,706 B2 | 11/2010 | Judge |
| 7,836,780 B2 | 11/2010 | Garnett et al. |
| 8,408,049 B2 | 4/2013 | Hurmuzlu et al. |
| 8,616,062 B2 | 12/2013 | Kono et al. |
| 2009/0268553 A1 | 10/2009 | Ecker et al. |
| 2010/0154560 A1* | 6/2010 | Mueller et al. ............ 73/861.18 |
| 2012/0000646 A1 | 1/2012 | Liotta et al. |

OTHER PUBLICATIONS

Coonrod et al., U.S. Appl. No. 13/457,871, filed Apr. 27, 2012.
RTD Sensors (Resistance Temperature Detector: Theory and Standards), webpage retrieved from an internet archive as having existed on Jul. 1, 2011 (retrieved on Aug. 12, 2013, from web.archive.org/web/20110701021505/http://www.thermometricscorp.com/rtdsensors.html), pp. 1-4.
Thomas, International Search Report and Written Opinion for PCT/US2013/037836, mailed Jul. 10, 2013.
Copenheaver, International Search Report and Written Opinion for PCT/US2013/037828, mailed Aug. 20, 2013.
Penz, Written Opinion from Intellectual Property Office of Singapore for Application No. 11201405700W (SG national stage entry of PCT/US13/37836), dated Jan. 9, 2015 (mailed by IPOS to Applicant on Feb. 3, 2015).
Penz, Written Opinion from Intellectual Property Office of Singapore for Application No. 11201405701P (SG national stage entry of PCT/US13/37828), dated Jan. 9, 2015 (mailed by IPOS to Applicant on Feb. 3, 2015).

* cited by examiner

POSITION MONITORING SYSTEM AND METHOD

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Such systems generally include a wellhead assembly through which resources are extracted.

In the case of an offshore system, such a wellhead assembly may include one or more subsea components that control drilling and/or extraction operations. For instance, such components may include one or more production trees (often referred to as "Christmas trees"), control modules, a blowout preventer system, and various casings, valves, fluid conduits, and the like, that generally facilitate the extraction of resources from a well for transport to the surface. Some of these components may include sub-components or devices that are configured for linear movement. For example, a blowout preventer system may include multiple blowout preventers assembled in a stack-like arrangement. Each of these blowout preventers may include one or more pistons that are configured to move in a linear direction when actuated. For instance, in the case of a ram-type blowout preventer, opposing pistons may be translated horizontally toward each other (e.g., via hydraulic actuation) to drive a corresponding pair of opposing rams toward the center of a wellbore. Other examples of linearly actuated devices that may be present in subsea equipment include various types of pressure or flow control devices, such as valves, connectors, and so forth.

Position monitoring (also referred to as ranging) with respect to such linear moving components has been an ongoing challenge for the industry, particularly with respect to devices that are deployed in subsea environments. Without an adequate position monitoring system, it is difficult for operators to assess the position of a linearly actuated component or how far the component has translated in response to an actuation event. Moreover, due to the harsh environments in which subsea equipment is often operated, the ability to monitor the condition of the subsea equipment is also useful. Having a reliable position monitoring system in place may provide for improved condition monitoring of subsea equipment. For example, position monitoring may be useful for determining whether or not a particular component exhibits an expected behavior in response to an actuation control input. In the absence of reliable position information, condition monitoring metrics may rely more heavily on the relationship between time parameters and actuation parameters, which may be insufficient to accurately delineate normalized condition status.

Existing solutions for position monitoring have included the use of electromechanical position sensing devices in conjunction with linearly actuated components. One example of an electromechanical position sensing device is a linear variable differential transformer (LVDT). However, the use of electromechanical devices in position monitoring is not without drawbacks. For instance, electromechanical devices, such as LVDTs, may be subject to a common-mode failure, as they are subject to a level of mechanical degradation similar to the component being monitored. Further, the incorporation of electromechanical position sensing devices into existing subsea equipment may require that existing equipment be redesigned and modified to accommodate the electromechanical position sensing devices and associated components, which may be not only be costly and time consuming, but oftentimes impractical.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure relate generally to an ultrasonic position sensing system for monitoring the position of a component configured for motion. In one embodiment, the position sensing system includes an ultrasonic position sensor and ranging logic that computes the position of the component relative to the position of the sensor. To determine the component position, the ranging logic transmits an electronic signal that is converted by a transducer within the sensor into an acoustic signal in the form of an ultrasonic pulse, which is then directed toward a surface of the moving component. When the pulse is reflected, a corresponding echo is received by the sensor, converted back into an electronic signal, and transmitted back to the ranging logic. The ranging logic determines several parameters to compute the position of the component, including the velocity of the pulse as a function of temperature and pressure and a fluid transit time of the ultrasonic pulse. Thus, once travel time and velocity are known, the ranging logic is able to determine the distance traveled by the ultrasonic pulse, which corresponds to the position of the moving component relative to the sensor.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
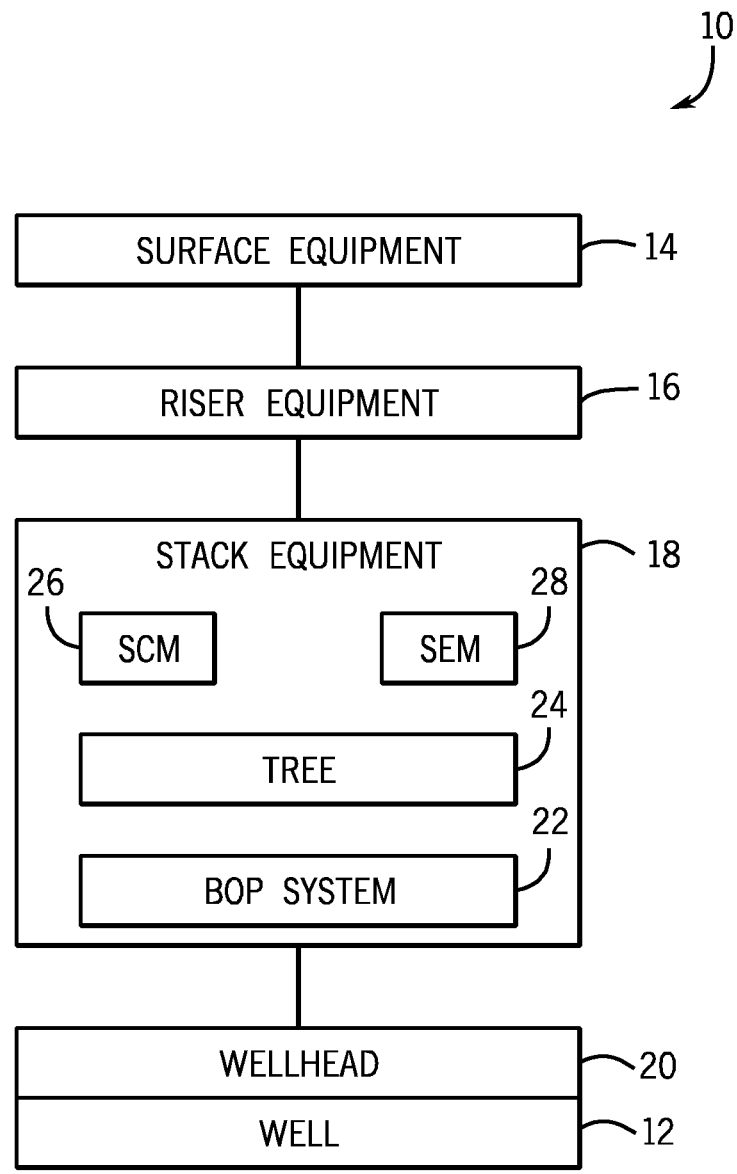
FIG. 1 is a block diagram depicting a subsea resource extraction system in accordance with aspects of the present disclosure.

Referring initially to FIG. 1, an exemplary resource extraction system 10 is illustrated in accordance with an embodiment of the present invention. The system 10 is configured to facilitate the extraction of a resource, such as oil or natural gas, from a well 12. As shown, the system 10 includes a variety of equipment, such as surface equipment 14, riser equipment 16, and stack equipment 18, for extracting the resource from the well 12 by way of a wellhead 20.

The system 10 may be used in a variety of drilling or extraction applications. Further, while the system 10 is depicted as an offshore or "subsea" system, it will be appreciated that onshore systems are also available. In the depicted system 10, the surface equipment 14 is mounted to a drilling rig located above the surface of the water, whereas the stack equipment 18 is coupled to the wellhead 20 proximate the sea floor. The surface equipment 14 and stack equipment 18 may be coupled to one another by way of the riser equipment 16.

As can be appreciated, the surface equipment 14 may include a variety of devices and systems, such as pumps, power supplies, cable and hose reels, control units, a diverter, a gimbal, a spider, and the like. Similarly, the riser equipment 16 may also include a variety of components, such as riser joints and connectors, fill valves, control units, and a pressure-temperature transducer, to name but a few. The riser equipment 16 may facilitate the transport of extracted resources (e.g., oil and/or gas) to the surface equipment 14 from the stack equipment 18 and the well 12.

The stack equipment 18 may include a number of components, including a blowout preventer (BOP) system 22. The blowout preventer system 22, which is sometimes referred to as a blowout preventer stack, may include multiple blowout preventers arranged in a stack-like configuration along a portion of a wellbore of the system 10. The blowout preventers present in this system 22 may include one or more ram-type blowout preventers and/or annular blowout preventers. In some embodiments, the system 22 may include multiple blowout preventers, each being configured to perform different functions. For example, a blowout preventer system 22 may include multiple ram-type blowout preventers, including those equipped with pipe rams, shear rams, and/or blind rams. The blowout preventer system 22 may also include blowout preventers of the same type and which perform the same function for redundancy purposes, as well as additional components, such as a wellhead connector, choke and kill valves and connectors, hydraulic accumulators, flex joints, control pods, a lower marine riser package (LMRP) connector, and so forth.

The blowout preventer system 22 generally functions during operation of the resource extraction system 10 to regulate and/or monitor wellbore pressure to help control the volume of fluid being extracted from the well 12 via the wellhead 20.

For instance, if well pressures are detected as exceeding a safe threshold level during drilling or resource extraction, which may indicate increased likelihood of a blowout occurring, one or more blowout preventers of the system 22 may be actuated via hydraulic control inputs to seal off the wellhead 20, thus capping the well 12. By way of example, in the case of a ram-type blowout preventer, each of a pair of opposing rams may be driven toward the center of a wellbore using respective pistons actuated via hydraulic control inputs, wherein each piston translates in a linear direction in response to the control input to move a respective ram. Such rams may be fitted with packers that form an elastomeric seal, which may seal the wellhead 20 by severing the casing or drill pipe and effectively cap the well 12. In the case of an annular blowout preventer, a piston may be linearly actuated to cause a packing unit to constrict around an object disposed in the wellbore, such as a drill string or casing.

Pistons used in blowout preventers represent an example of a linearly actuated device or component. That is, such pistons may translate in a linear direction in response to a control input to drive another component, such as a ram (in ram-type blowout preventers) or a packing unit (in annular blowout preventers). As will be discussed in more detail below with respect to FIG. 2, the blowout preventer system 22 of the presently disclosed embodiments includes a position sensing system that utilizes ultrasonic position sensing devices that enables the resource extraction system 10 to determine the linear position of a linearly actuated component or device being monitored. As used herein, the terms device and component may generally be used interchangeably when referring to an object having its position being monitored by the position sensing system.

One aspect of position monitoring may refer to a determination of the linear position (e.g., position along a linear path of movement) of a device of interest with respect to the position of ultrasonic position sensor. For example, in the case of a blowout preventer, the position sensing system may utilize ultrasonic ranging to determine the linear position of a piston within a blowout preventer. For example, in a ram-type blowout preventer, the position of the piston may indicate how far its corresponding ram has moved in response to actuation. Additionally, it should be understood that position monitoring, as implemented by the position sensing system, may also be capable of monitoring the position of a stationary device or, to some extent, a device that moves in a non-linear fashion (e.g., a circular path, curved path, etc.)

Other components of the stack equipment 18 of FIG. 1 include a production tree 24, commonly referred to as a "Christmas tree," subsea control module 26, and subsea electronics module 28. The tree 24 may include an arrangement of valves, and other components that control the flow of an extracted resource out of the well 12 and upward to the riser equipment 16 which in turn facilitates the transmission of the extracted resource upward to the surface equipment 14, as discussed above. In some embodiments, the tree 24 may also provide additional functions, including flow control, chemical injection functionality, and pressure relief. By way of example only, the tree 24 may be a model of a subsea production tree manufactured by Cameron International Corporation of Houston, Tex.

The subsea control module 26 may provide for electronic and/or hydraulic control of the various components of the stack equipment 18, including the blowout preventer system 22. Further, the subsea electronic module 28 may be designed to house various electronic components, such as such as printed circuit boards containing logic to carry out one or more functions. For instance, with respect to the ultrasonic position sensing system, the subsea electronic module 28 may include ranging logic configured to calculate or otherwise determine the position of a linearly actuated device based on the pulse-echo response of an ultrasonic position sensing device that monitors the linearly actuated device.

Figure 2:
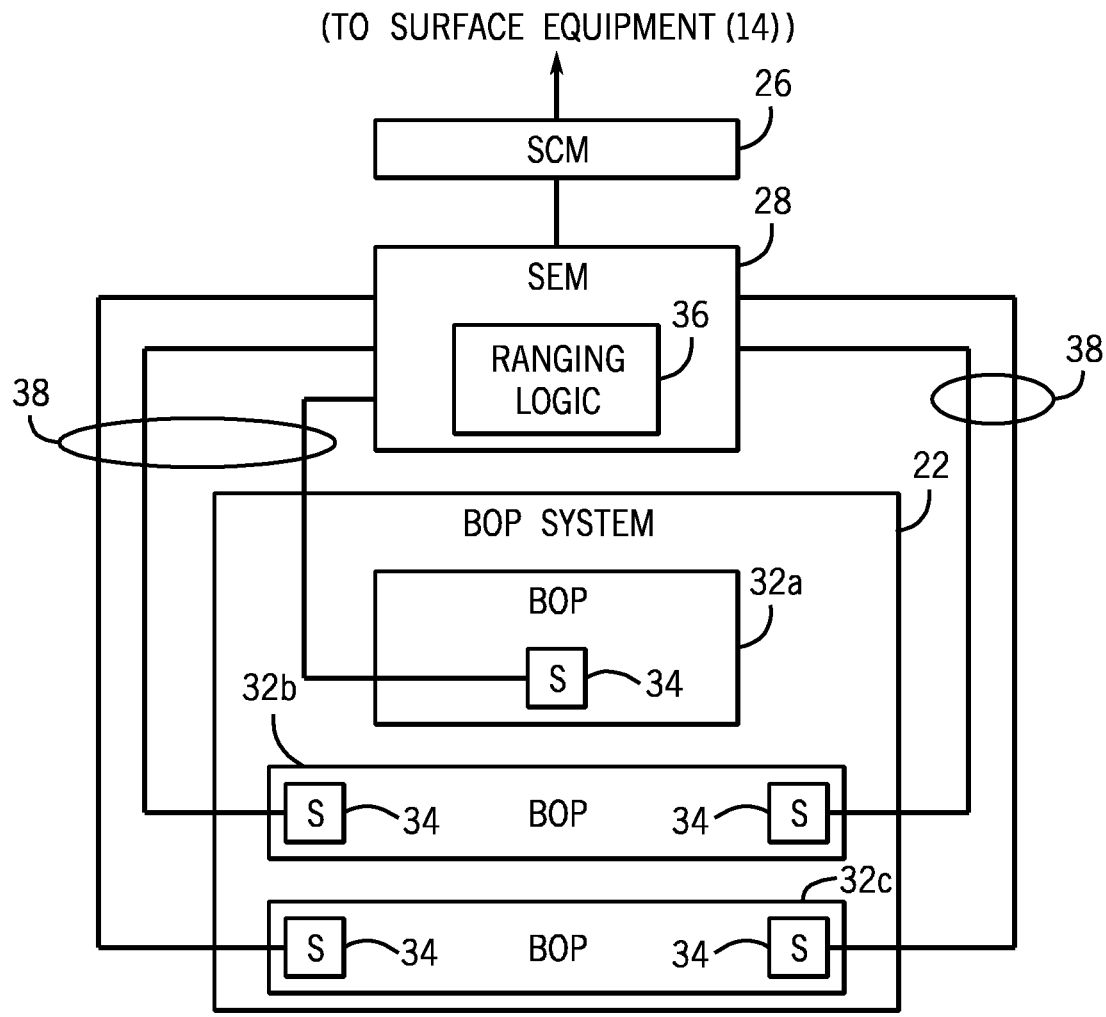
FIG. 2 is a block diagram that depicts a blowout preventer system that is part of the resource extraction system of FIG. 1, wherein the blowout preventer system incorporates an ultrasonic position sensing system and has multiple blowout preventers each having at least one ultrasonic position sensing device in accordance with aspects of the present disclosure.

With these points in mind, FIG. 2 is a block diagram showing an example of a blowout preventer system 22 having multiple blowout preventers 32, including an annular blowout preventer 32a and at least two ram-type blowout preventers 32b and 32c. Of course, other embodiments may utilize fewer or more blowout preventers 32. As discussed above, ram-type blowout preventers may be adapted for different functions based on the type of ram blocks equipped. For instance, a ram-type blowout preventer may include pipe rams that are configured to close around a pipe within a wellbore to restrict fluid flow within the annular conduit between the pipe and the wellbore but not within the pipe itself, shear rams configured to cut through a drill string or casing, or blind rams configured to seal off a wellbore. Rams may also include blind shear rams that are configured to seal a wellbore even when occupied by a drill string or casing. Accordingly, the ram-type blowout preventers 32b and 32c of FIG. 2 may be any one of the above-mentioned ram-type blowout preventers, and may perform the same or different functions.

FIG. 2 additionally illustrates an ultrasonic position sensing system, depicted herein by way of the ultrasonic position sensing devices 34 and the ranging logic 36, which is shown as being contained within the subsea electronic module 28. As will be discussed in more detail below, an ultrasonic position sensing device 34 may be provided for each linearly actuated device in which position monitoring is desired. For example, with respect to each of the ram-type blowout preventers 32b and 32c, at least two sensors 34 may be provided, each being configured to sense the linear position of a respective one of a pair of opposing pistons. As generally depicted in FIG. 2, the sensors 34 may be located on opposite ends of the ram-type blowout preventers 32b and 32c. The annular blowout preventer 32a, which may include one piston for driving a packing unit, also includes a corresponding sensor 34 for monitoring the linear position of the piston.

Each position sensing device 34 includes an ultrasound transducer configured to convert an electrical signal received from ranging logic 36 into an acoustic signal in the form of an ultrasonic pulse. The pulse is then transmitted by the position sensing device toward a surface of the linearly actuated device. The reflection of the ultrasonic pulse off a surface of the linearly actuated device, which may be referred to as an echo, is then directed back toward the position sensing device 34 and received by the transducer, converted back into an electrical signal, and transmitted back to the ranging logic 36. This path from the ranging logic 36 to the sensor 34 and to the linearly actuated device and back may be referred to as the signal path, which includes both the electronic and acoustic paths.

The ranging logic 36 is configured to determine several parameters, including the total transit time along the signal path, the velocity of the ultrasound pulse, and any delay time in the signal path between the logic 36 and the linearly actuated device. As will be discussed in further detail below with respect to FIG. 8, based on the foregoing parameters, the ranging logic 36 calculates the path length along which the ultrasonic pulse travels to determine the linear position of the device (e.g., piston of a blowout preventer) being monitored. That is, the logic 36 determines the position of the linearly actuated device with respect to the position of the sensor 34 with which it is associated. Further, while certain embodiments described herein relate to the use of the position monitoring system for assessing the linear position of a particular component, the position monitoring system may also be used to determine the position of a component that is stationary or moves in a non-linear manner with respect to the sensor 34.

As shown in FIG. 2, communication cables 38 may include wiring that relays signals between the ultrasonic position sensors 34 and the ranging logic 36 in the subsea electronic module 28. The module 28 may be disposed in a housing that is capable of withstanding the subsea environment. In other embodiments, the ranging logic 36 may be positioned proximate to the linearly actuated device, such as on the housing of a blowout preventer having a piston/ram that is being monitored using a respective sensor 34. Additionally, the ranging logic 36 may also be distributed in some manner across the subsea electronic module 28 and on the housing of a subsea component containing the linearly actuated device(s) of interest.

Collectively, the subsea control module 26 and electronic module 28 may include communication circuitry that provides for communication with each other, with various subsea components in the stack equipment 18, and with the surface equipment 14 and/or riser equipment 16. For instance, an umbilical containing one or more cables for relaying data may transmit data from the stack equipment 18, subsea control module 26, and/or electronic module 28 to the surface equipment 14 and/or rise equipment 16. In one embodiment, such data may be transmitted in accordance with a communication protocol, such as Modbus, CAN bus, or any other suitable wired or wireless communication protocol. Accordingly, position information acquired using the ultrasonic position sensing system may be transmitted to the surface equipment 14, thus enabling an operator to monitor the operation of various subsea devices monitored by the sensors 34.

Figure 3:
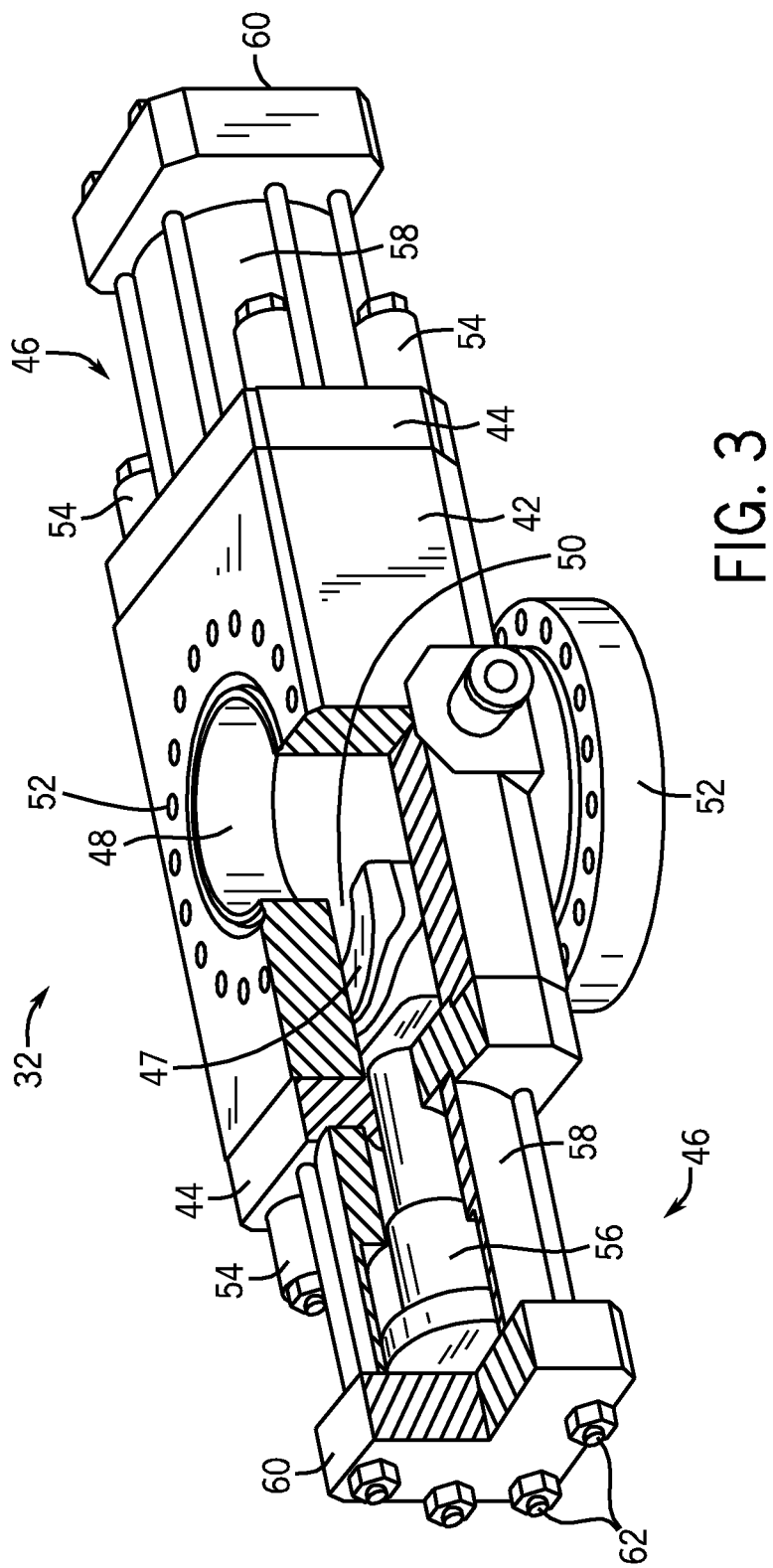
FIG. 3 is a more detailed partial cut-away perspective view of a ram-type blowout preventer that may be part of the blowout preventer system of FIG. 2.

Referring now to FIG. 3, a partial cutaway perspective view of a ram-type blowout preventer 32 that includes an ultrasonic position sensor 34 is illustrated in accordance with one embodiment. The illustrated ram-type blowout preventer 32 includes a body 42, bonnets 44, actuator assemblies 46 and closing members 47 in the form of ram blocks. In the present embodiment, the rams 47 are shown as pipe rams by way of example only. As discussed above, other embodiments of the blowout preventer 32 may include shear rams, blind rams (sometimes referred to as sealing rams), or blind shear rams. The body 42 includes a wellbore 48, ram cavity 50, and upper and lower bolted connections 52 that may be used to assemble additional components above and below the blowout preventer 32, such as when the blowout preventer 32 is arranged as part of a blowout preventer stack assembly.

The bonnets 44 are coupled to the body 42 by bonnet connectors 54. These connectors 54 may allow for the bonnets 44 to be removed from the body 42 of the blowout preventer 32 to provide access to the rams 47. Respective actuator assemblies 46 are mounted to the bonnets 44 at opposite ends of the body 42. As shown in FIG. 3, one of the actuator assemblies 46 is shown in a partial cut-away view to expose and thus better illustrate the components therein. Thus, while the description of the actuator assemblies 46 may focus on the exposed actuator assembly of FIG. 3, it should be understood that the unexposed actuator assembly 46 on the opposite end of the body 42 is configured in the same manner. For example, the actuator assembly 46 includes a hydraulic piston 56 disposed in a cylinder 58. In response to hydraulic control inputs, the piston 56 may stroke in a linear direction within the cylinder 58, which may drive a corresponding ram 47 through the ram cavity 50, into and out of the wellbore 48.

As further shown in FIG. 3, the end of the cylinder 58 opposite the bonnet 44 is coupled to a head 60 by way of bolted connectors 62. In one embodiment, an ultrasonic position sensor 34 may be installed in the head 60 of each actuator assembly 46 to provide for linear position monitoring of the pistons 56 within their respective cylinders 58. For example, if the pistons 56 are actuated to drive the rams 47 to at least partially seal the wellbore 48, the use of the ultrasonic position sensors 34 in conjunction with the ranging logic 36 may enable an operator to monitor the movement of the pistons 56 and rams 47 and to determine whether they are responding to the actuation event (e.g., hydraulic control input) in an expected manner.

Figure 4:
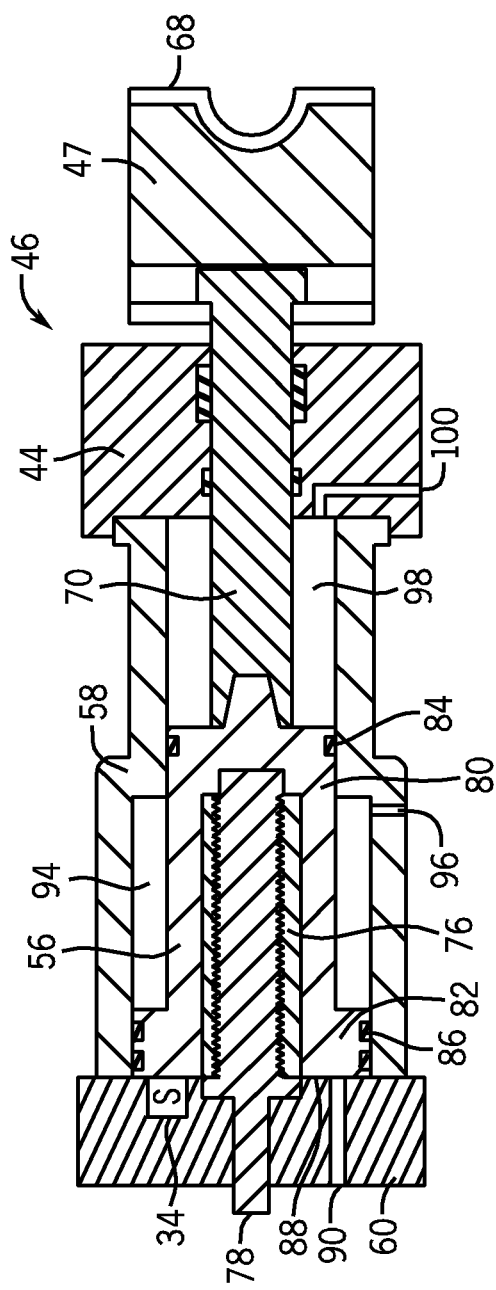
FIG. 4 is a cross-sectional view showing an actuator assembly of the ram-type blowout preventer of FIG. 3 having a piston in a retracted (open) position in accordance with aspects of the present disclosure.
Figure 5:
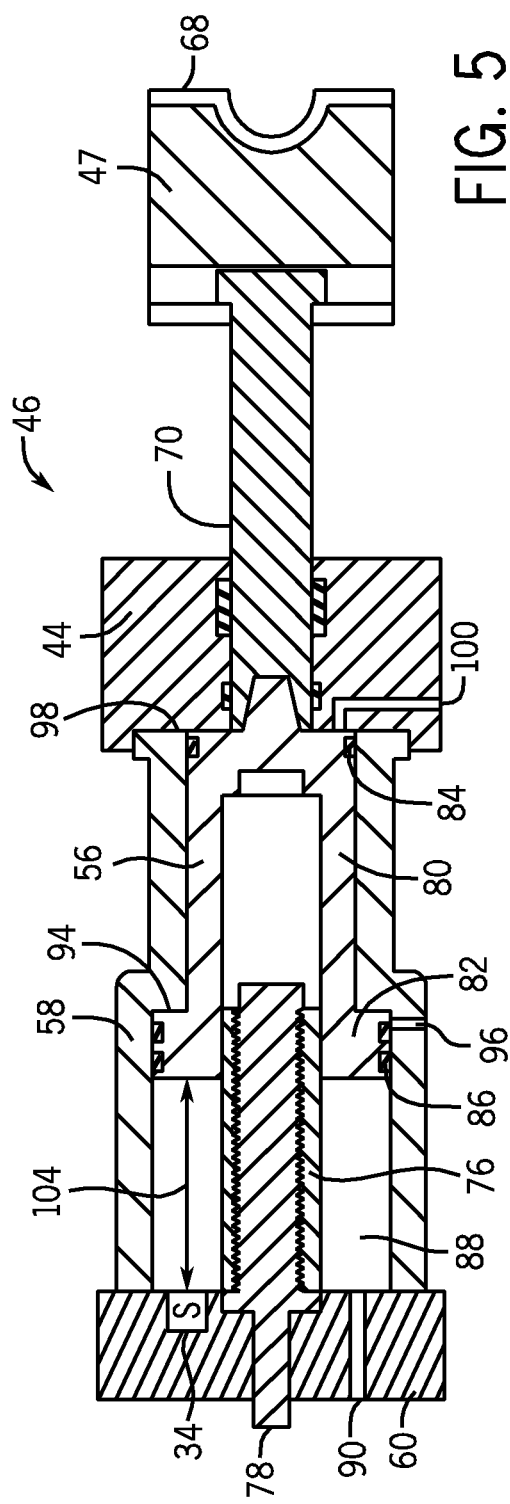
FIG. 5 is a cross-sectional view showing the actuator assembly depicted in FIG. 4, but with the piston in an extended (closed) position.

FIGS. 4 and 5 provide cross-sectional views showing one of the actuator assemblies 46 of FIG. 3 in more detail. As shown, the actuator assembly 46 is mounted to the bonnet 44 and coupled to a ram 47. In the illustrated embodiment, the ram 47 is shown as being a pipe ram with the distal end of the ram 47 (i.e., closest to the wellbore 48) including a packer 68 that forms a seal around a pipe disposed within the wellbore 48 when both rams 47 are extended from their respective ram cavities 50 into the wellbore 48. Of course, as discussed above, other types of rams 47 may include shear rams and blind rams.

In addition to the cylinder 58 containing the piston 56, the actuator assembly 46 also includes a piston rod 70, the head 60, a sliding sleeve 76, and a locking rod 78. The piston 56 includes a main piston body 80 and a flange 82. The body 80 and flange 82 portions of the piston 56 may include one or more seals, referred to by reference numbers 84 and 86, respectively. As shown in FIGS. 4 and 5, the body seal(s) 84 circumferentially surround the piston body 80 while sealingly engaging the inner wall of the cylinder 58. Similarly, the flange seal(s) 86 circumferentially surround the piston flange 82 while sealingly engaging the inner wall of the cylinder 58.

The engagement of body seal 84 and flange seal 86 with cylinder 58 divides the interior of the cylinder 58 into three hydraulically isolated chambers: an extend chamber 88, a slack fluid chamber 94, and a retract chamber 98. An extend port 90 provides hydraulic communication with the extend chamber 88, which is formed between the head 60 and the flange seal 86. Similarly, a slack fluid port 96 provides hydraulic communication with the slack fluid chamber 94, which is formed in an annular region defined by the cylinder 58 and piston 56 between the body seal(s) 84 and flange seal(s) 86. Further, a retract port 100 provides fluid communication with a retract chamber 98, which is formed in an annular region defined by the cylinder 58 and piston 56 between the body seal(s) 84 and the bonnet 44.

In operation, the extend chamber 88 and the retract chamber 98 may be in fluid communication with a hydraulic fluid supply (not shown in FIG. 4 or 5) regulated by a control system. In some embodiments, hydraulic fluid expelled from the extend chamber 88 and retract chamber 98 may be recycled into the hydraulic fluid supply or may be vented to the surrounding environment. The slack fluid chamber 94 may be pressure-balanced with the surrounding environment such that fluid pressure within the slack chamber 94 does not resist the movement of the piston 56 when actuated. In certain embodiments, the slack fluid chamber 94 may be left open to the surrounding environment (e.g., sea water) or may be coupled to a pressure compensation system that maintains balanced pressure within the slack fluid chamber 94.

With respect to FIG. 4, the actuator assembly 46 is shown in a fully retracted position in which the piston 56 is disposed against the head 60. This is sometimes referred to as the open position. When an actuation input is provided, such as via hydraulic controls, pressurized hydraulic fluid is supplied through the extend port 90. This actuates the assembly 46 and causes the piston 56 to stroke, i.e., move in a linear direction, away from the head 60 toward the bonnet 44. As the piston 56 moves toward the bonnet 44, the hydraulic fluid provided via the extend port 90 enters the extend chamber 88. At the same time, fluid within the retract chamber 98, which may also include pressurized hydraulic fluid, is expelled through the retract port 100, and fluid within the slack fluid chamber 94 is expelled through the slack fluid port 96. Fluid expelled from the slack fluid chamber 94 and retract chamber 98 during operation may be retained in a reservoir or, in some cases, ejected to the surrounding environment. As discussed above, the slack fluid chamber 94 may be open to the environment in some embodiments. For example, the fluid that enters and leaves the slack fluid chamber 94 in such an embodiment may be sea water in the case of a subsea installation.

Accordingly, as hydraulic fluid is supplied to the extend chamber 88, the piston 56 will continue to move in a linear direction towards the bonnet 44 until the piston 56 makes contact with the bonnet 44. This is shown in FIG. 5, which illustrates the actuator assembly 46 in a fully extended position (sometimes referred to as the closed position). Although actuator assembly 46 is actuated by hydraulic pressure, many applications may also include a mechanical lock in order to maintain the position of the ram 47, such as in situations where there is a loss of hydraulic pressure. In order to positively lock the piston 56, and thus the ram 47, in position, the sliding sleeve 76 is rotationally fixed relative to the piston 56 and threadably engaged with a locking rod 78 that is rotatably coupled to the head 60. The sliding sleeve 76 moves axially relative to the locking rod 78 when the locking rod 78 is rotated, thereby locking the position of the piston 56 and ram 47.

When the piston 56 is actuated from an initially retracted position, as shown in FIG. 4, and begins to translate linearly away from the head 60 towards the bonnet 44, the distance 104 (FIG. 6) between the head 60 and the piston 56 continues to increase until the piston 56 reaches the end of its stroke, as shown in FIG. 5, i.e., the body 80 of the piston 56 has made contact with the bonnet 44. The ultrasonic position sensor 34 may be provided in the head 60 of the actuator assembly 46 to enable position monitoring of the piston 56. The sensor 34 may be configured to transmit an ultrasonic pulse and receive a corresponding echo due to the reflection of that pulse off a surface of the piston 56. As will be discussed in more detail below, the time that elapses between the transmission of the pulse and the receipt of the corresponding echo may be used by the ranging logic to determine the distance that pulse traveled, and thus determine the linear position of the piston 56. In most cases, the device of interest may actually be the ram 47. However, since the ram 47 is driven by the piston 56, by knowing the linear position of the piston 56, one is able to deduce how far the ram 47 has traveled.

Figure 6:
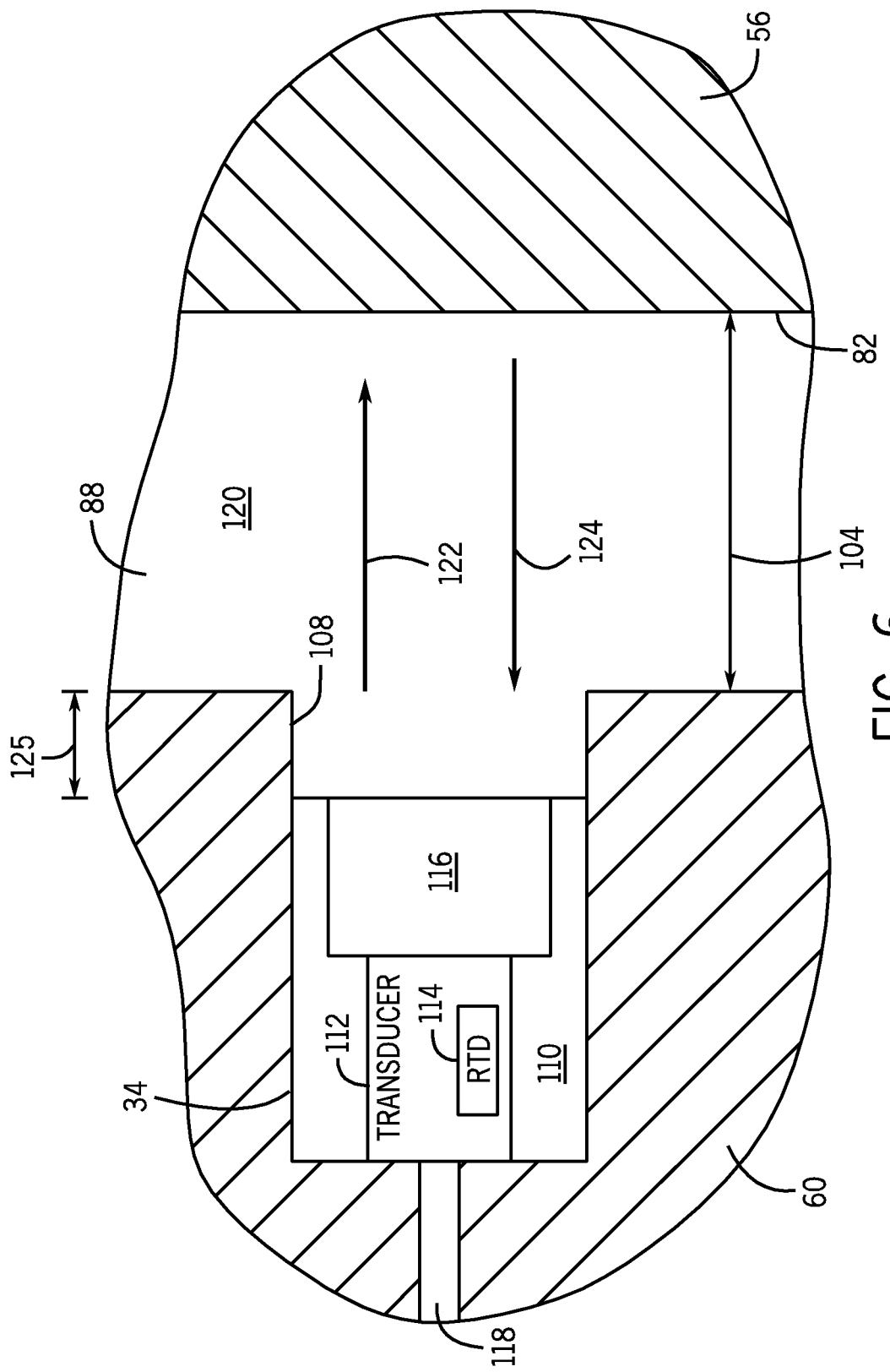
FIG. 6 is a more detailed cross-sectional view showing an ultrasonic position sensing device installed in the actuator assembly of the ram-type blowout preventer shown in FIGS. 3 to 5, and being configured to sense the position of the piston in accordance with aspects of the present disclosure.

Referring now to FIG. 6, a more detailed cross-sectional view is provided that illustrates an ultrasonic position sensor 34 in accordance with one embodiment. Particularly, the sensor 34 is shown as being installed in the head 60 of the actuator assembly 46 depicted in FIGS. 4 and 5 and configured to direct ultrasonic pulses toward the piston 56. In the illustrated embodiment, the head 60 includes a recess 108 configured to receive the sensor 34. The sensor 34 includes a housing 110, an ultrasound transducer module 112, a temperature sensing device 114 (shown in FIG. 6 as a resistance temperature detector (RTD)), and a transducer window 116. In certain embodiments, the transducer 112 may be of a model of an ultrasound transducer module manufactured by Cameron International Corporation. The temperature sensing device 114 may be a discrete component within the housing 110 or may be embedded as part of the transducer module 112, as shown in FIG. 6. In the present embodiment, an opening 118 is also provided and may extend from the recess 108 through the opposite side of the head 60 to allow for the passage of wiring between the sensor 34 and ranging logic 36.

The sensor 34 may be secured within the recess using any suitable mechanism. For instance, in one embodiment, both the recess 108 and the sensor housing 110 may be threaded and generally cylindrical in shape. Accordingly, the sensor 34 may be installed in the head 60 by simply rotating the sensor housing 110 into the recess 108, thus allowing the respective threads to engage one another. In other embodiments, the sensor 34 may be secured in the recess 108 using an adhesive, connectors, or any other suitable technique. Overall, this provides for a relatively simple installation of the sensor 34 without requiring significant and/or complex redesign of existing subsea equipment.

To monitor the linear position of the piston 56 during operation, the ultrasonic position sensor 34 may intermittently transmit an ultrasonic pulse 122. The pulse 122 may originate from the transducer 112 and propagate through the window 116 and into the extend chamber 88, which may be filled with pressurized hydraulic fluid 120 as the piston 56 is actuated. The window 116 may include a high compressive strength plastic material having acoustic impedance properties that are similar to liquid. This allows for the transmitted pulse 122 to leave the sensor housing 110 while experiencing relatively little acoustic impedance. By way of example only, the window 116 may formed using a polyetherimide material, such as ULTEM™, available from SABIC of Saudi Arabia, organic polymer thermoplastic materials, such as polyether ether ketone (PEEK), or a polyimide-based plastic, such as Vespel™, available from E.I. du Pont de Nemours and Company of Wilmington, Del. The housing 110 may be manufactured using a metal material, such as steel or titanium, or may be formed using one of the aforementioned plastic materials, or using a combination of metal and plastic materials.

After propagating through the window 116, the pulse 122 then travels the distance 104 between the head 60 and the piston 56 through the hydraulic fluid 120. Upon impacting the piston 56, the pulse 122 is reflected in the form of a corresponding echo 124. The transducer 112 receives the echo 124 as it propagates back toward the sensor 34 through the hydraulic fluid 120 and the window 116. The transducer 112 may operate at any suitable frequency, such as between approximately 200 kilohertz and 5.0 megahertz. In one embodiment, the transducer 112 is configured to operate at a frequency of approximately 1.6 megahertz. Further, though not expressly shown in FIG. 6, the sensor 34 may include wiring that may be routed through the opening 118, which may have a diameter or width that is less than that of the recess 108. Referring briefly back to FIG. 2, this wiring may represent the wiring 38 that provides for communication between the sensors 34 and the ranging logic 36.

While the recess 108 is shown in FIG. 6 as having a width (e.g., a diameter in the case of a circular recess) that is greater than that of the opening 118, in one embodiment, the recess 108 may be an opening that extends all the way through the end cap 60. That is, the opening 118 and the recess 108 may have the same width. In such an embodiment, the sensor housing 110 may be configured to extend through the end cap 60. Also, in such an embodiment, wiring from the transducer module 112 and/or the RTD 114 may form a connector coupled to the housing 110, wherein the connector is configured to electronically connect wiring within the sensor 34 to the ranging logic 36. For instance, such a connector may be accessible from outside the cylinder 58 of the blowout preventer 32 and may be coupled to the ranging logic using one or more suitable cables. This embodiment also allows for the ultrasound sensing device 34 to be installed from the outside of the blowout preventer 32 or any other component in which it is to be installed, which obviates the need for any disassembly of the end cap 60 from the body of the blowout preventer 32 during installation. For instance, where the recess 108 extends all the way through the end cap 60 and includes threads that engage corresponding threads on the sensor 34, the sensor 34 may be installed from the outside by rotating the sensor assembly 110 into the recess 108 from the outside of the end cap 60 until the threads securely engage one another.

As will be discussed in more detail below with respect to FIG. 8, the ranging logic 36 may obtain or otherwise determine several parameters which are used to compute the path length along which the ultrasonic pulse 122 traveled prior to being reflected. This path length may correspond to the distance 104, which may enable an operator to determine the linear position of a particular device, such as the piston 56 in this example. The parameters obtained and/or determined by the ranging logic include a computed velocity of sound (VOS) through a fluid as a function of temperature and pressure, a delay time, and a signal path transit time. For example, the temperature parameter (e.g., the temperature within the extend chamber 88) may be measured using the temperature sensing device 114. The pressure parameter (e.g., the pressure within the extend chamber 88) may be provided to the ranging logic 36 as an expected pressure value or, in other embodiments, may be measured pressure information provided to the ranging logic 36 by one or more pressure sensing devices.

The delay time may represent non-fluid delays present in the signal path which, as discussed above, includes the entire path (both electrical and acoustic portions) between the ranging logic 36 and the monitored device. For instance, the presence of the window 116 and the wiring 38 may introduce non-fluid delays. By subtracting out the delay time from the total transit time and dividing the result by two, the fluid transit time of the pulse 122 (or of its corresponding echo 124) may be determined. Accordingly, once the velocity of the ultrasonic pulse/echo through the hydraulic fluid 120 and the fluid transit time are known, the path length between the head 60 and the piston 56 may be calculated by the ranging logic 36, thus providing the linear position of the piston 56. By knowing the linear position of the piston 56, the system 10 can determine how far the ram 47 has traveled. In some embodiments, the fluid 120 need not necessarily be a liquid. For instance, the fluid 120 may include a gas or a gas mixture, such as air.

In the present example, the ultrasonic position sensor 34 is used to monitor the linear position of a piston in a blowout preventer of a subsea resource extraction system 10. Accordingly, the sensor 34 may be designed to be durable enough to withstand harsh environmental conditions often associated with subsea operation. In one embodiment, the sensor housing 110, in which the sensor 34 is disposed, may be manufactured using titanium, stainless steel, or any other suitable type of metal, alloy, or super-alloy, and may be capable of operating at pressures of between approximately 14 pounds per square inch (PSI) to 14,000 PSI. For example, the window 116 of the sensor housing 110 may withstand loads of up to 14,000 PSI. The sensor 34 may also be capable of withstanding operating temperatures of between 0 to 100 degrees Celsius.

As shown in FIG. 6, the sensor 34 may be recessed within the recess 38 by a distance shown by reference number 125. This distance 125 may be selected based at least partially upon certain properties of the window 116, such as thickness and sound velocity characteristics, to compensate for signal reverberation within the medium of the window 116. This reverberation is due to resonating properties of the window 116. For example, when the ultrasonic pulse 122 is transmitted from the sensor 34, a portion of the signal 122 may reverberate within the window 116 before dissipating. The amount of time that it takes for this reverberation to dissipate may constitute what is sometimes referred to as a signal dead band. If an echo (e.g., 124) arrives at the sensor 34 within this signal dead band, the sensor 34 may be unable to acquire an accurate measurement due to interference from the ongoing signal reverberation within the window 116. This is generally most problematic when the target device, here the piston 56, is very close to the head 60 (e.g., near or at the open position shown in FIG. 4), such that the elapsed time for the echo 124 to return to the sensor 34 falls within the dead band. Accordingly, recessing the sensor 34 by a distance 125 within the recess 108 may compensate for the dead band effects, thus allowing the sensor 34 accurately acquire measurements for generally any position of the piston 56 within the cylinder 58.

The distance 125 may be selected as a function of the thickness of the window and its resonance properties. For instance, a plastic material, such as ULTEM™ or PEEK may have resonating properties in which an ultrasonic signal reverberates within the window 116 for approximately two round trips before dissipating. Thus, in this example, the goal in selecting the distance 125 is that the earliest time at which an echo 124 reflected from the piston 56 returns to the sensor is outside of the signal dead band time, with the most extreme case being when the piston 56 is in the open position. Additionally, it should be noted that the plastic materials discussed above generally have lower resonating properties when compared to that of certain other materials, particularly metals such as steel. By comparison, in a sensor where the ultrasonic pulse 122 is transmitted through a metal material, like steel, the ultrasonic signal 122 may reverberate for approximately ten or more round trips within the steel before dissipating. This may result in a longer dead band, which may require a greater distance 125 when compared to that of a sensor 34 that uses a lower-resonating plastic material of similar thickness, such as ULTEM™.

Figure 7:
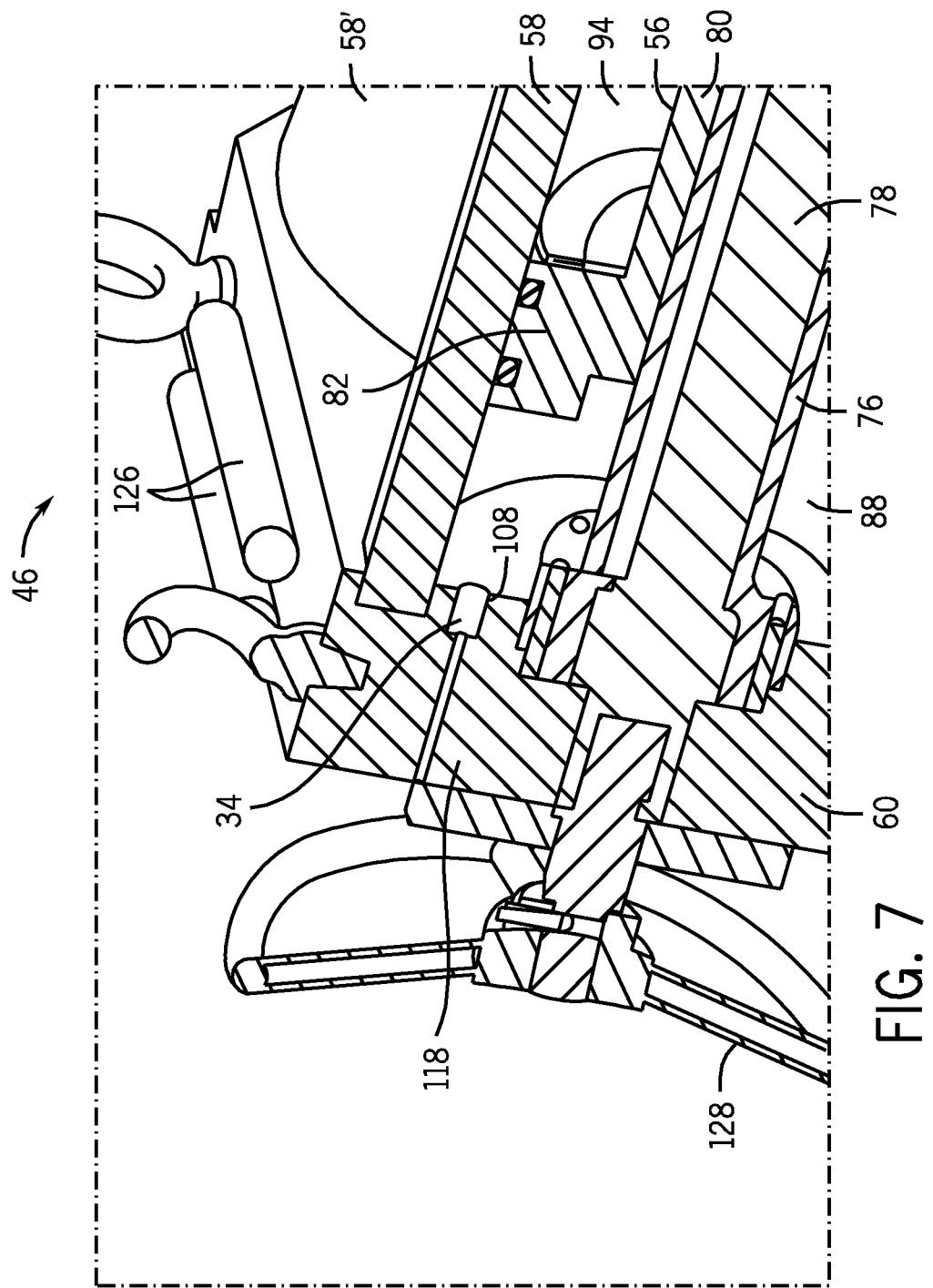
FIG. 7 is a cross-sectional perspective view of the actuator assembly depicted in FIGS. 4 and 5 that shows the ultrasonic position sensing device installed in the actuator assembly.

FIG. 7 is a more detailed perspective cross-sectional view that shows the actuator assembly 46 of a ram-type blowout preventer 32 similar to that described above in FIGS. 3 to 5, with the actuator assembly 46 having an ultrasonic position sensor 34 installed in the head 60 via the recess 108. In this illustrated embodiment, the blowout preventer 32 may be a dual-ram blowout preventer that includes two rams on each side of a wellbore. Each ram on a particular side may be driven by a respective piston 56 within a cylinder 58 of an actuator assembly 46 coupled to the body of the blowout preventer 32. For instance, in FIG. 7, the cylinder 58 may house one piston 56 while the adjacent cylinder 58' may house another piston (not visible in FIG. 7). Accordingly, the actuator assembly 46 corresponding to the adjacent cylinder 58' may also include a similarly configured ultrasonic position sensor 34.

FIG. 7 also depicts a handle 128 that may be engaged to rotate the locking rod 78 to lock an extended piston 56 into the extended position. For example, the handle 128 may be engaged and operated by a remotely operated vehicle (ROV) or a manned underwater vehicle, such as a submarine. Moreover, FIG. 7 also shows an embodiment in which at least part of the ranging logic 36 is located on the housing of the blowout preventer rather than being centralized within the subsea electronic module 28, as is shown in FIG. 2. For example, ranging logic 36 may be distributed across multiple components, with portions of the logic 36 being housed in a subsea enclosure, referred to herein as a ranging unit 126, and affixed or otherwise secured to the housing of a component, here the head 60 of a blowout preventer 32. In this arrangement, all ranging units 126 collectively make up the ranging logic 36, and each ranging unit 126 is configured receive input parameters and compute position information for a linearly actuated device being monitored by a respective sensor 34.

Thus, in FIG. 7, the two ranging units 126 shown may correspond to the sensors 34 that monitor piston movement within the cylinders 58 and 58'. For instance, wiring extending through the opening 118 may connect each sensor 34 to its respective ranging unit 126. Further, each ranging unit 126 may be configured to communicate position information to the subsea control module 26 and/or subsea electronic module 28, which may then relay the information to the surface. Moreover, while the embodiment described above shows the sensor 34 as being installed in the head 60, other embodiments may include a sensor 34 installed on the piston 56 itself. Thus, in such embodiments, the ranging logic 36 may determine the linear position of the piston 56 relative to the location of the head 60 or some other point or reference.

Having generally described the operation of the sensor 34 above, a process 130 by which the ranging logic 36 may compute the linear position of a monitored device is now described in further detail with reference to FIG. 8. Generally, the linear position of a device of interest (e.g., a piston/ram of a blowout preventer), may be determined using the following equation:

$$d = VOS \times t_{fluid}, \quad \text{(Eq. 1)}$$

wherein VOS represents the velocity of the ultrasonic pulse emitted by the sensor 34 through a given medium (such as hydraulic fluid within the extend chamber 88) and $t_{fluid}$ represents the one-way fluid transit time of the ultrasonic pulse (or its corresponding reflection), which may be equivalent to the total transit time in one direction along the signal path with non-fluid delays removed. These parameters are then used to determine the distance d across which the ultrasonic pulse travels from the sensor 34 to the device of interest, thus enabling one to determine the linear position of the device relative to the position of the sensor 34.

As discussed above, VOS may be determined as a function of pressure and temperature. For instance, in one embodiment, VOS may be computed in accordance with Wayne Wilson's equation for the velocity of sound in distilled water as a function of temperature and pressure, as published in the *Journal of the Acoustic Society of America*, Vol. 31, No. 8, 1959. This equation is provided below:

$$VOS = [A_0 \ A_1 \ A_2 \ A_3 \ A_4] \times \begin{bmatrix} 1 \\ T \\ T^2 \\ T^3 \\ T^4 \end{bmatrix}, \quad \text{(Eq. 2a)}$$

wherein T represents temperature in Celsius and $A_n$ represents coefficients for computing the speed of sound, wherein the coefficients $A_n$ are calculated as a function of pressure, as shown below:

$$[A_0 \ A_1 \ A_2 \ A_3 \ A_4] = \begin{bmatrix} a_0 & a_1 & a_2 & a_3 \\ b_0 & b_1 & b_2 & b_3 \\ c_0 & c_1 & c_2 & c_3 \\ d_0 & d_1 & d_2 & d_3 \\ e_0 & e_1 & e_2 & e_3 \end{bmatrix} \times \begin{bmatrix} 1 \\ P \\ P^2 \\ P^3 \end{bmatrix} \quad \text{(Eq. 2b)}$$

Here, P represents pressure in bar and $a_n$, $b_n$, $c_n$, $d_n$, and $e_n$ all represent additional sub-coefficients for computing sound velocity. Thus, by substituting Equation 2b into Equation 2a, VOS may be calculated as follows:

$$VOS = \left( \begin{bmatrix} a_0 & a_1 & a_2 & a_3 \\ b_0 & b_1 & b_2 & b_3 \\ c_0 & c_1 & c_2 & c_3 \\ d_0 & d_1 & d_2 & d_3 \\ e_0 & e_1 & e_2 & e_3 \end{bmatrix} \times \begin{bmatrix} 1 \\ P \\ P^2 \\ P^3 \end{bmatrix} \right) \times \begin{bmatrix} 1 \\ T \\ T^2 \\ T^3 \\ T^4 \end{bmatrix}, \quad \text{(Eq. 2c)}$$

Equation 2c may be written into expanded form as:

$$VOS = A_0 + A_1 T + A_2 T^2 + A_3 T^3 + A_4 T^4, \quad \text{(Eq. 2d)}$$

wherein:

$$A_0 = a_0 + a_1 P + a_2 P^2 + a_3 P^3$$

$$A_1 = b_0 + b_1 P + b_2 P^2 + b_3 P^3$$

$$A_2 = c_0 + c_1 P + c_2 P^2 + c_3 P^3$$

$$A_3 = d_0 + d_1 P + d_2 P^2 + d_3 P^3$$

$$A_4 = e_0 + e_1 P + e_2 P^2 + e_3 P^3$$

When applied to determine the velocity of sound through distilled water under a known pressure and temperature, the following coefficients may be used in Wilson's sound velocity equation (Equations 2a-2d above):

$$A_0 = 1402.859 + 1.050469 e^{-2} P + 1.633786 e^{-7} P^2 - 3.889257 e^{-12} P^3$$

$$A_1 = 5.023859 + 6.138077 e^{-5} P - 1.080177 e^{-8} P^2 + 2.477679 e^{-13} P^3$$

$$A_2 = -5.690577 e^{-2} - 1.071154 e^{-6} P + 2.215786 e^{-10} P^2 - 5.088886 e^{-15} P^3$$

$$A_3 = 2.884942 e^{-4} + 1.582394 e^{-8} P - 2.420956 e^{-12} P^2 + 5.086237 e^{-17} P^3$$

$$A_4 = -8.238863 e^{-7} - 6.839540 e^{-11} P + 9.711687 e^{-15} P^2 - 1.845198 e^{-19} P^3$$

The computed values for the coefficients $A_n$ may then be substituted into Equation 2d above to obtain the velocity of sound through distilled water at a pressure and temperature represented by P and T, respectively.

Figure 8:
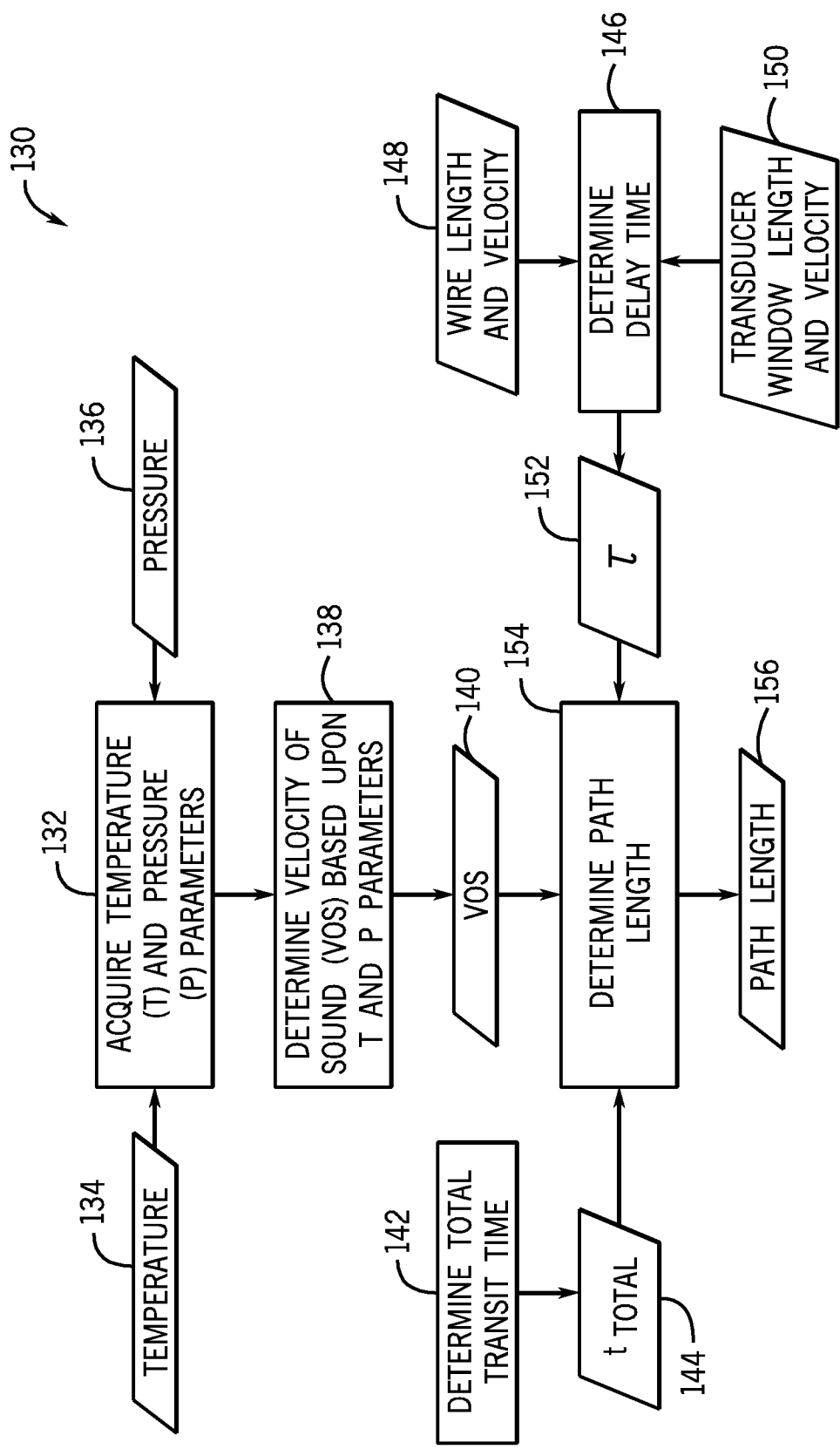
FIG. 8 is a flow chart depicting a process for determining a path length corresponding to the position of a movable component using an ultrasonic position sensing system in accordance with aspects of the present disclosure.

As can be appreciated, the steps described above for determining VOS may correspond to steps 132 and 138 of the process 130 depicted in FIG. 8. For instance, at step 132, a temperature value (T) 134 and pressure value (P) 136 are acquired. As discussed above, the temperature value may be obtained using the temperature sensing device 114 of the ultrasonic position sensor 34, while pressure may be supplied to the ranging logic 36 as an expected or measured value (e.g., measured by a pressure sensing device on the blowout preventer or other subsea equipment). In some embodiments, the temperature may also be provided to the ranging logic 36 as an expected value rather than being a measured value provided by the temperature sensing device 114. Once these parameters are determined at step 132, the ranging logic 36 may compute the velocity of sound 140 in accordance with Wilson's equation at step 138.

It should further be noted that the specific example of the numerical coefficients provided above correspond to the properties of distilled water. Nevertheless, these coefficients may provide for a relatively accurate calculation sound velocity through hydraulic fluids that are largely based upon water (e.g., 99% water-based hydraulic fluids). Additionally, the numerical coefficients above may also be adjusted to account for any differences in the properties of distilled water and a water-based hydraulic fluid to further improve the accuracy of the sound velocity calculation.

The other parameters used by the ranging logic to determine the distance d from Equation 1 include the total transit time of the ultrasonic signal, including any non-fluid portions of the signal path (e.g., window 116, wiring 38), and a non-fluid delay time corresponding to delays that non-fluid portions of the signal path contribute. Once the total transit time and non-fluid delay times are known, the fluid transit time in one direction (e.g., that of either the pulse or the echo) is determined as follows:

$$t_{fluid} = \frac{t_{total} - \tau}{2}, \quad \text{(Eq. 3)}$$

wherein $t_{total}$ represents the total transit time of both the electronic and acoustic signals along the signal path, i.e., from the ranging logic 36, along wiring 38 to the transducer 112, through the window 116, through a fluid medium (e.g., hydraulic fluid 120) in one direction toward a device of interest, and back through each of these components following the reflection of the pulse. Accordingly, non-fluid components in this signal path, which may include the window 116 and wiring 38 introduce some amount of delay, represented above in Equation 3 as $\tau$. Thus, the fluid transit time in one direction (e.g., either the pulse from the sensor to the device or interest or the echo from the device back to the sensor) is determined by removing the non-fluid delay $\tau$ from the total transit time, $t_{total}$, and dividing the result by two, wherein the division by two gives a time value corresponding to the fluid transit time in one direction (rather than a round-trip time).

The total transit time, $t_{total}$, may be determined via pulse-echo path processing performed by the ranging logic 36. For instance, the ranging logic 136 may determine the amount of time that elapses between sending a signal that causes the pulse and receiving a signal resulting from the corresponding echo. This is represented by step 142 of the process 130, which produces the total transit time ($t_{total}$) 144. With respect to the non-fluid delay, each non-fluid component within the signal path may introduce a respective delay that may be expressed as follows:

$$\tau_{non-fluid\_component} = 2 \times \frac{L}{C}, \quad \text{(Eq. 4)}$$

wherein L represents the length of the portion of the signal path through the non-fluid component and C represents the velocity of the signal through the non-fluid component. The result is multiplied by two to account for the non-fluid delay in both the outgoing path and return path. By way of example only, assuming that the wiring 38 has a length of approximately 6 meters and that signal velocity through the wiring 38 is approximately $1.4*10^8$ meters/second, the non-fluid delay contributed by the wiring ($\tau_{wire}$) approximately 0.0857 microsecond ($\mu$s). Similarly, assuming that the window 116 of the sensor 34 has a thickness of approximately 15.74 millimeters and allows for the ultrasonic pulse to traverse it at a velocity of approximately 2424 meters/second, the non-fluid delay contributed by the window 116 ($\tau_{window}$) is approximately 13.0724 $\mu$s.

These non-fluid delay components ($\tau_{wire}$ and $\tau_{window}$) are then summed to obtain the total non-fluid delay time $\tau$, which is represented by step 146 of the process 130 in FIG. 8. For instance, wire length and velocity characteristics 148 and transducer window length and velocity characteristics 150 are provided to step 146. Using the expression set forth above in Equation 4, the ranging logic may compute the total non-fluid delay time ($\tau$) 152 based on the parameters 148 and 150.

Thereafter, step 154 of the process 130 provides for the computation of the path length 156 between the sensor 34 and the linearly actuated device using the calculated sound velocity (VOS) 140, total pulse-echo transit time 144 along the signal path, and the non-fluid delay time 152. Using Equation 3, the fluid transit time in one direction may be calculated as half the total transit time 144 less the non-fluid delay time 152. Accordingly, once the fluid transit time is known, the path length 156 may be computed in accordance with Equation 1. When applied to the examples described above with regard to a blowout preventer, the path length 156 may represent linear position information regarding how far a piston, and thus its corresponding ram, has moved in response to an actuation input.

The path length result 156 of FIG. 8 generally yields a measurement of how far the piston is relative to the window 116 of the sensor 34. As will be appreciated, for even further accuracy in some embodiments, the calculated path length 156 may be further reduced by the distance by which the sensor 34 is recessed within the head 60 (e.g., distance 125 of FIG. 6) to give a measurement of distance of the piston with respect to the inside wall (e.g., forming part of extend chamber 88) of the head 60.

As noted above, in an embodiment where a hydraulic fluid used to actuate a device is not distilled water or substantially water-based, the coefficients used in Equations 2a-2d above may be adjusted, such as via empirical testing, to provide accurate sound velocity results when ultrasonic signals are transmitted through non-water fluids or those that are not substantially water-based. In another embodiment, rather than relying on Equations 2a-2d for the calculation of sound velocity, a combination of multiple sensors 34 may be used to determine the position of a device of interest, with at least one sensor being directed towards the device of interest and another sensor being directed to a generally constant reference point. In such an embodiment, these sensors may be referred to as a measuring sensor and a reference sensor, respectively.

Figure 9:
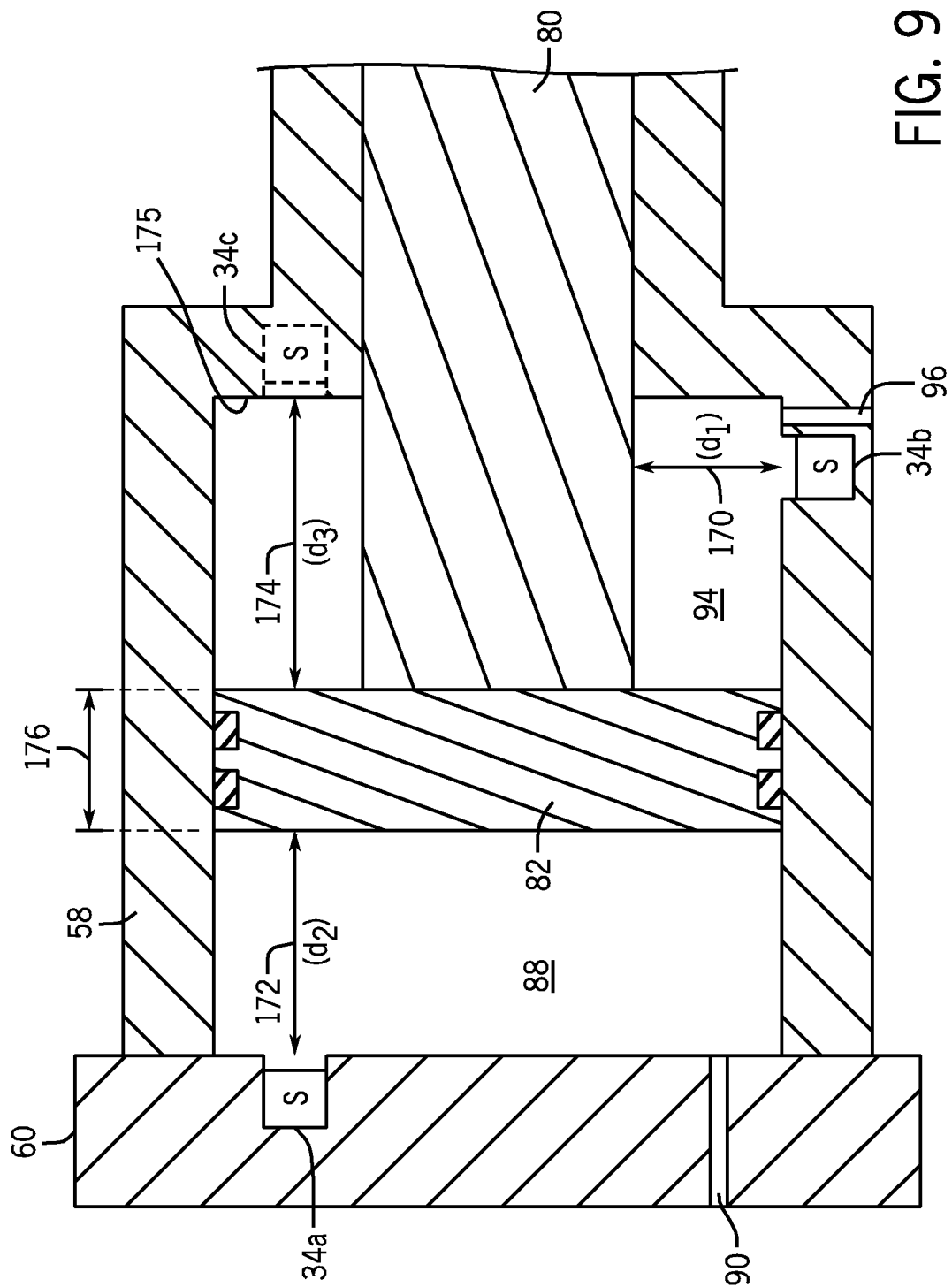
FIG. 9 is a cross-sectional view showing a portion of the actuator assembly of the ram-type blowout preventer of FIGS. 4 and 5 that includes multiple ultrasonic position sensing devices in accordance with aspects of the present disclosure.

An example of such an embodiment is shown in FIG. 9. Specifically, FIG. 9 shows an embodiment of the above-described ram-type blowout preventer 32 in which a piston 56 is actuated using a hydraulic fluid that is not water or substantially water-based, such as an oil-based hydraulic fluid. Here, to determine the position of the piston 56, sensors 34a and 34b are provided in the cylinder 58, with the sensor 34a being a measuring sensor and the sensor 34b being a reference sensor. The sensor 34a is oriented and configured like the sensor 34 shown in FIG. 6 to measure the distance 172 ($d_2$) between the head 60 and the piston 56. The sensor 34b is identical to the sensor 34a, but is oriented to measure the distance 170 ($d_1$) between the inside wall of the cylinder 58 and the shaft 80 of the piston 56. As can be appreciated, the distance 170 is generally constant except for periods when the piston 56 is in or almost in the closed position (e.g., when the flange portion 82 of the piston 56 enters the line of sight of the sensor 34b). However, excluding such periods, the distance 170 measured by the sensor 34 is a known distance $d_1$. According, the velocity of sound through the hydraulic fluid in slack fluid chamber 94 may be determined as follows:

$$VOS = \frac{2 \times d_1}{t_{1\_fluid}}, \quad \text{(Eq. 5)}$$

wherein VOS represents the sound velocity over the known distance $d_1$ and $t_{1\_fluid}$ represents the round-trip fluid transit time of an ultrasonic signal from the sensor 34b to the shaft 82 and back. As can be appreciated, the fluid transit time $t_{1\_fluid}$ may be calculated in a manner similar that described above, i.e., determining the total transit time and removing non-fluid delays (e.g., wiring delays, window-imparted delays).

When the sound velocity VOS calculated using Equation 5 above is known, the distance 172 may be calculated as follows:

$$d_2 = \frac{VOS \times t_{2\_fluid}}{2}, \quad \text{(Eq. 6)}$$

Here, $t_{2\_fluid}$ represents the round-trip fluid transit time of an ultrasonic pulse (and its corresponding echo) emitted by the sensor 34a, which may again be calculated by measuring the round-trip total transit time along the signal path of the sensor 34a and removing non-fluid delays (e.g., wiring delays, window-imparted delays). The division by a factor of two results in a one-way fluid transit time which, when multiplied by the known VOS value from Equation 5, provides the distance $d_2$ corresponding to the path length between the sensor 34b and the piston 56. As discussed above, any distance by which the sensor 34b is recessed may be subtracted from the path length ($d_2$) to determine the distance of the piston 56 from the head 60 of the cylinder 58.

As can be appreciated, while the velocity of sound through a fluid may vary as pressure and/or temperature characteristics change, in a subsea application utilizing the ram-type blowout preventer 32, temperature and pressure characteristics are generally not expected to vary greatly within short amounts of time. Additionally, ranging logic 36 may be configured detect when the piston flange 82 is in the line of sight of the sensor 34b and to discard measurements for VOS acquired when the piston 56 is in such a position. In this situation, most recent VOS values from prior to the piston flange 82 impeding the sensor's 34b line of sight may be used in determining the path length $d_2$ as the piston 56 nears the closed position. In the present embodiment, the sensors 34a and 34b are oriented such that they take measurements in directions that are perpendicular to one another.

As further shown in FIG. 9, the cylinder 58 may include the sensor 34c positioned within the inside wall 175 at the end of the cylinder 58 opposite the head 58, i.e., the end that the flange 82 contacts when the piston 56 is actuated to the closed position. This sensor 34c may be used instead of or in addition to the sensor 34a for assessing the position of the piston 56. For instance, the distance 174 ($d_3$) between the sensor 34c and the flange 82 of the piston 56 may be determined using the known distance 170 ($d_1$). For instance, similar to the calculation of $d_2$ by Equation 6 above, the distance $d_3$ may be calculated as follows:

$$d_3 = \frac{VOS \times t_{3\_fluid}}{2}, \quad \text{(Eq. 7)}$$

Thus, the distance $d_3$ indicates generally how far the piston 56 is with respect to the sensor 34c on the inside wall 175. Moreover, in this example, the distance of the piston with respect to the head 60 may also be calculated by adding a known width 176 of the piston flange 82 to the calculated distance $d_3$, and subtracting the result from the length of the cylinder 58, as measured from the head 60 to the inside wall 175. Further, some embodiments may include both sensors 34a and 34c, wherein the results obtained using each respective sensor may provide a degree of redundancy (e.g., if one sensor fails) or may be compared against one another for validation purposes.

The position calculation algorithms described above may be implemented using suitably configured hardware and/or software in the form of encoded computer instructions stored on one or more tangible machine-readable media. In a software implementation, the software may additionally provide a graphical user interface that may display information for presentation to a human operator. For instance, position measurements acquired by the ultrasonic position sensing system may be displayed on a monitor of a workstation located at the surface of the resource extraction system 10 or at a remote location. The software may also be configured to save data logs for monitoring device positions (e.g., the position of rams) over time. Moreover, in the event that an accurate measurement cannot be obtained, the software may provide for a visual and/or audible alarm to alert an operator. In some embodiments, a virtual (e.g., part of the software graphical user interface) or hardware-based (e.g., a component of a workstation) oscilloscope may be provided for displaying the ultrasonic waveform that is transmitted and received. An example of such a user interface will be described in more detail below with respect to FIG. 16. In a further embodiment, signal stacking may be used to some extent to improve signal-to-noise ratio.

Figure 10:
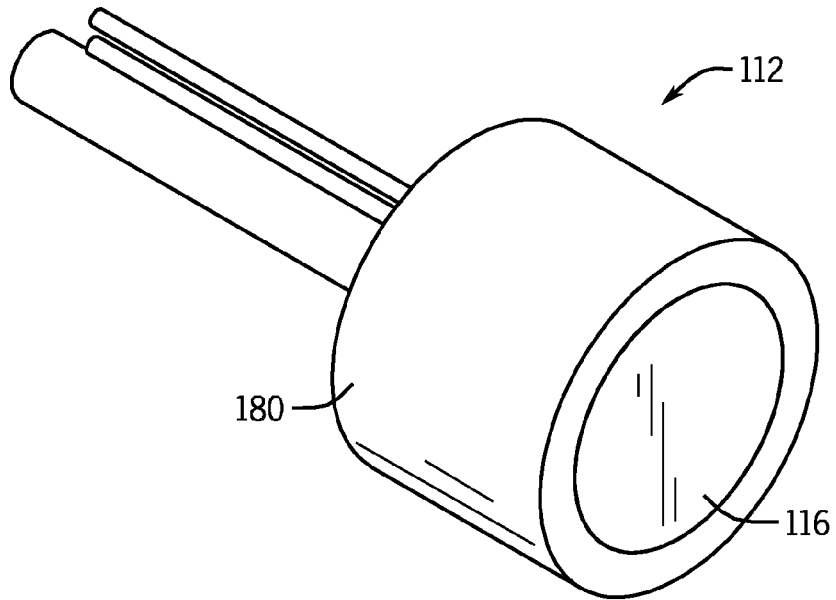
FIGS. 10 to 12 collectively show a transducer assembly that may be used in an ultrasonic position sensing device in accordance with one embodiment.
Figure 11:
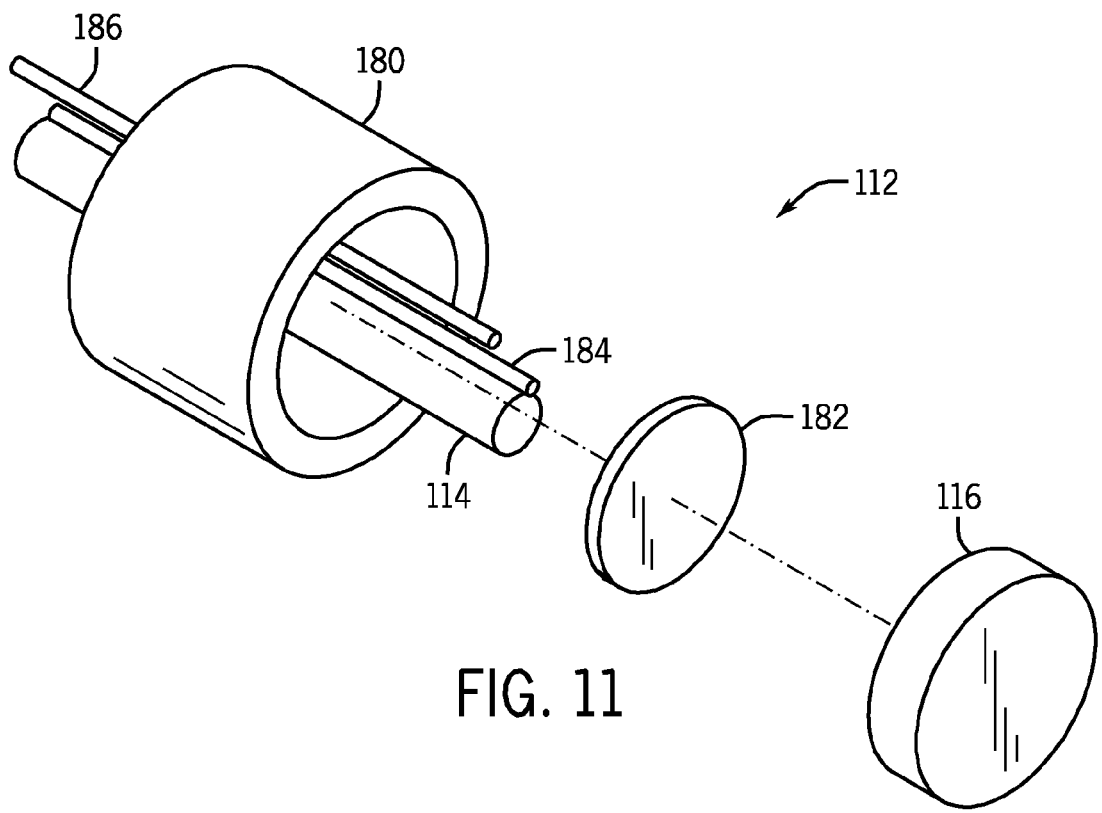
Figure 12:
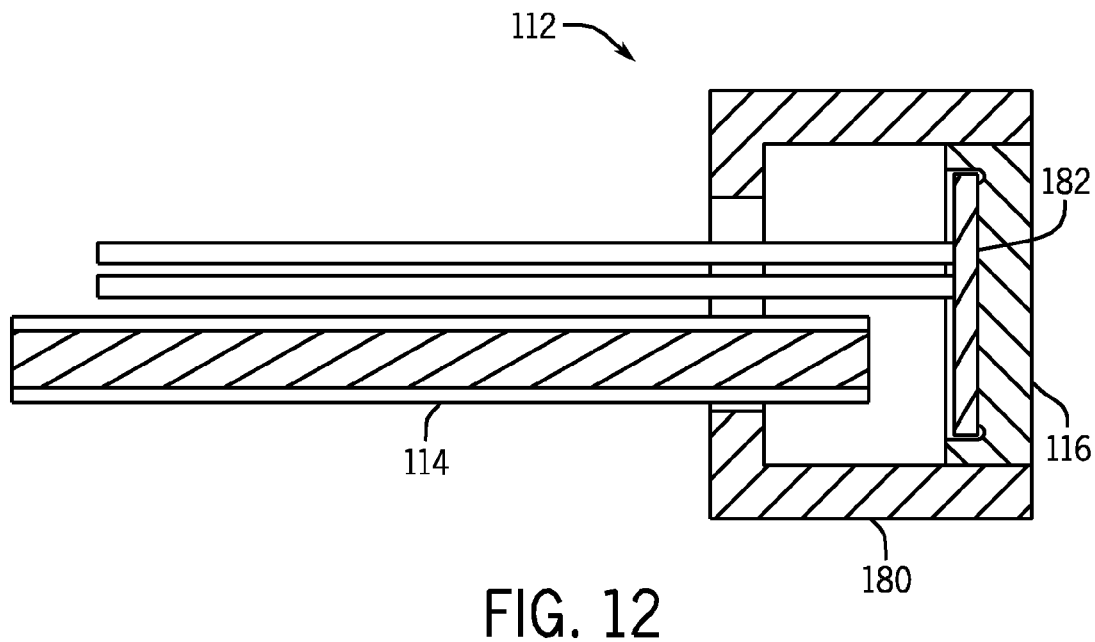

As discussed above with reference to FIG. 6, each ultrasonic position sensor 34 includes a transducer 112. One embodiment of the transducer 112 is shown in more detail in FIGS. 10 to 12. Specifically, FIGS. 10 and 11 show assembled and exploded perspective views, respectively, of the transducer 112, and FIG. 12 shows a cross-sectional view of the transducer 112.

The transducer 112 includes the above-described window 116, as well as a casing 180, piezoelectric material 182, positive lead 184, negative lead 186. The transducer 112 also includes the above-described resistance temperature detector (RTD) for acquiring temperature data, and may be a two-wire or four-wire RTD. As best shown in FIG. 10, the positive lead 184, negative lead 186, and RTD 114 extend outward from the rear end (e.g., the end opposite the window 116) of the transducer 112. When assembled within a device, such as the head 60 of a blowout preventer 32, portions of the positive lead 184, negative lead 186, and RTD 114 may extend through the opening 118 (FIG. 6). The casing 180 generally encloses the components of the transducer 112 and may be designed to fit within the sensor housing 110, as shown in FIG. 6. In one embodiment, the casing 180 may be formed using the same high compressive strength plastic material as the window 116, such as ULTEM™, PEEK, or Vespel™. In other embodiments, the casing 180 may be formed using a metal material, such as steel, titanium, or alloys thereof. The piezoelectric material 182 may be formed using a crystal or ceramic material. For example, in one embodiment, the piezoelectric material 182 may include lead zirconate titanate (PZT).

Figure 13:
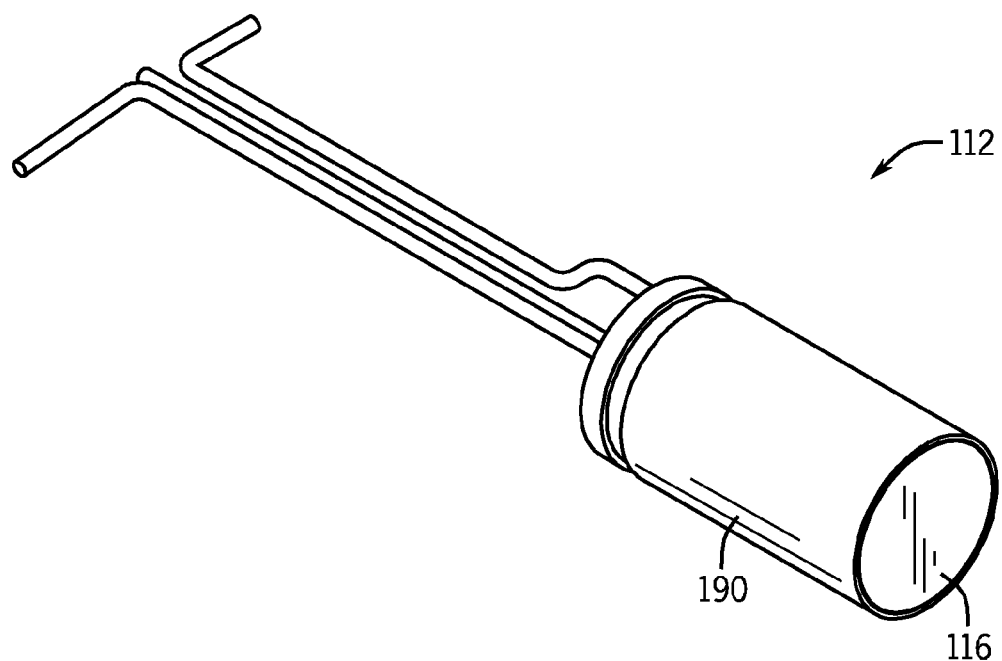
FIGS. 13 and 14 collectively show a transducer assembly that may be used in an ultrasonic position sensing device in accordance with another embodiment.
Figure 14:
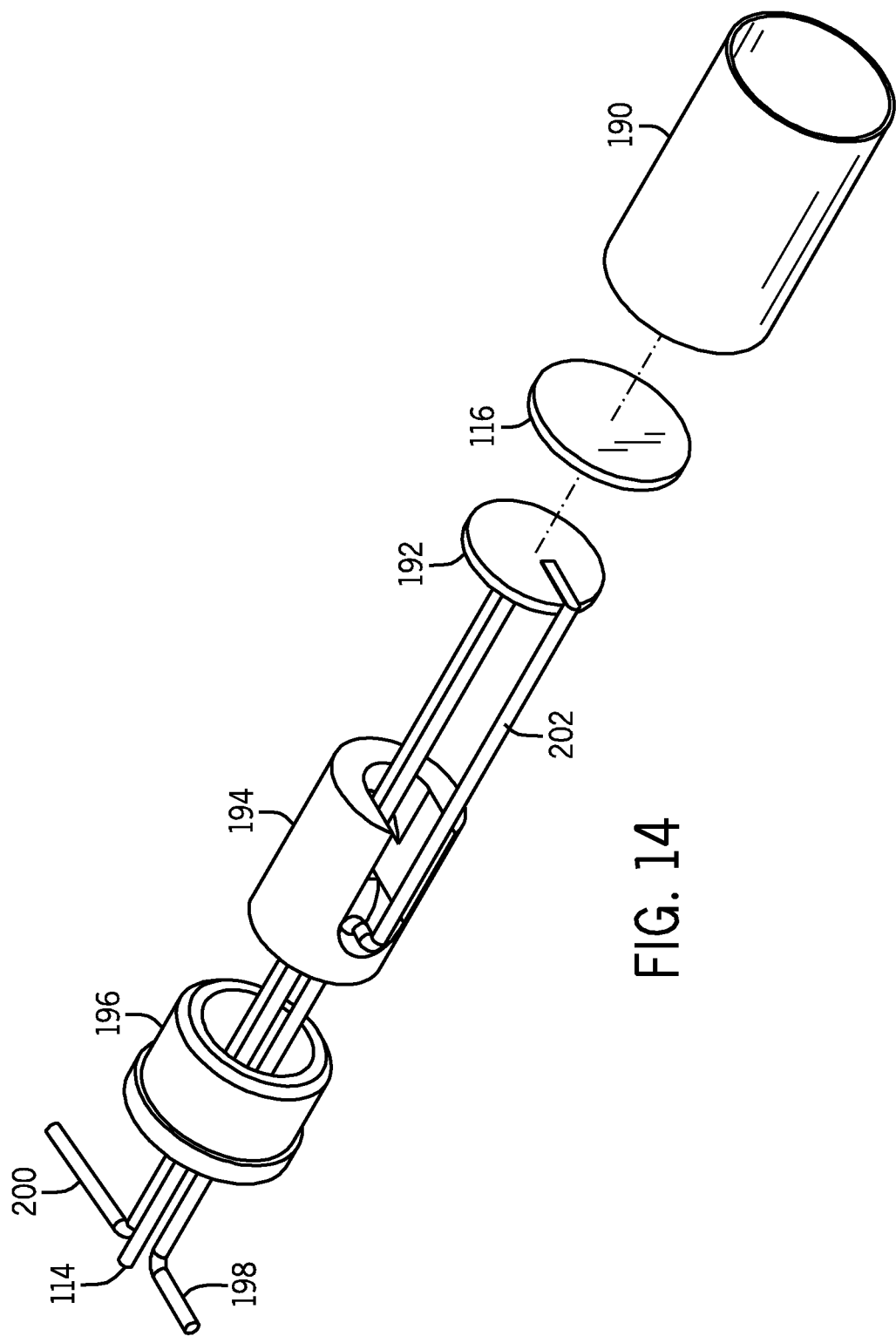

Another embodiment of the transducer 112 is illustrated in FIGS. 13 and 14. Specifically, FIGS. 13 and 14 show assembled and exploded perspective views, respectively, of the transducer 112. Here, the transducer 112 includes the window 112 and RTD 114, as well as a casing 190, piezoelectric material 192, load cylinder 194, cap 196, positive 198 and negative 200 leads, and epoxy potting 202. The casing 190, load cylinder 194, and cap 196 may be formed using high compressive plastic or a metal material, such as steel. The piezoelectric material 192 may include PZT. Further, in this embodiment, the window 116 may include a high compressive plastic, such as ULTEM™, PEEK, or Vespel™, or may be formed as a wear plate using aluminum oxide (alumina). In some embodiments, the window 116 may include an alumina wear plate interposed between a plastic window and the piezoelectric material 192. Due to the impedance, density, and velocity characteristics of alumina with respect to sound, such an embodiment may allow for acoustic energy to be transmitted through an alumina wear plate and into a plastic window with reduced distortion, provided that the dimensions and thickness of such a wear plate are selected accordingly.

Figure 15:
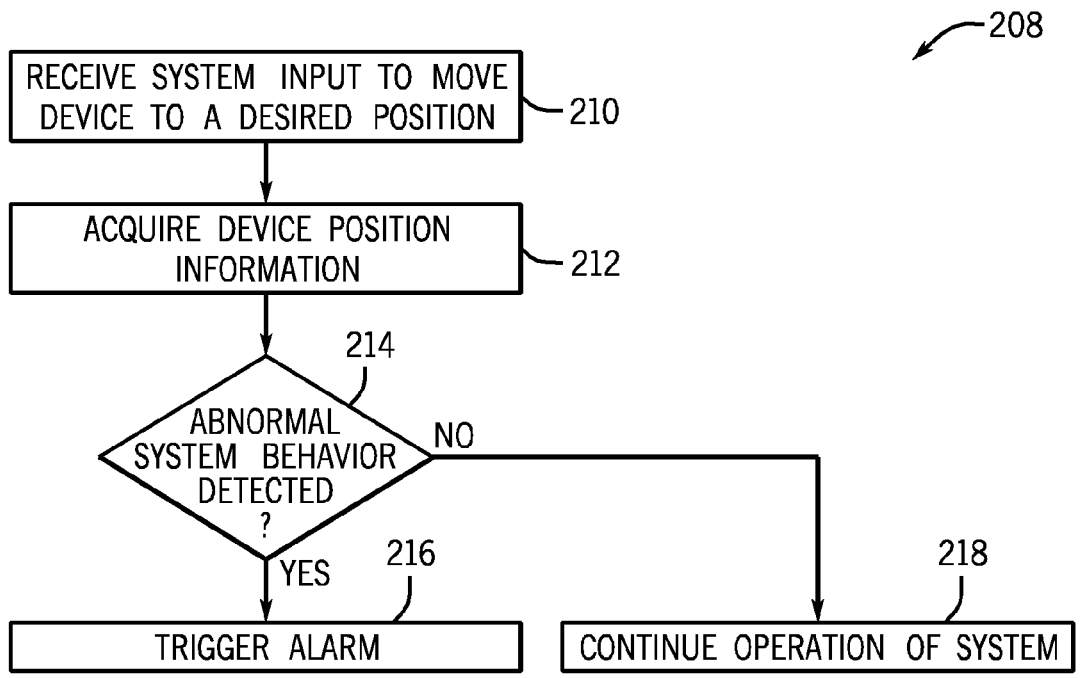
FIG. 15 is a flow chart depicting a process by which the position monitoring techniques set forth herein are used to monitor the operation of a device and to trigger an alarm condition if abnormal behavior of the device is detected.

Referring to FIG. 15, a process 208 for operating of a system that includes an ultrasonic ranging system (e.g., system 36) for monitoring the position of certain devices is illustrated in accordance with an embodiment. As shown, the process 208 begins at step 210 where a system input is received. The input may represent a command to move a device within the system to a desired position. For instance, in the context of a subsea system, the input may represent a command to close or open a ram of a blowout preventer, wherein the closed or open position represents the desired position. The system may actuate (e.g., hydraulic actuation) the device in accordance with the received input to cause the device to move to the desired position.

As the device (e.g., ram) moves toward the desired position, one or more associate ultrasonic sensors 34 may provide position information to the system, as shown at step 212. The expectation is that the device being actuated will move to the desired position at the conclusion of the actuation process. Decision logic 214 determines if abnormal system behavior is detected. In this context, abnormal behavior may be any type of movement (or lack of movement) that deviates from an expected behavior. For instance, if the device being actuated is a ram that fails to attain a closed position in response to a command to close the ram, the process 208 may trigger an alarm to indicate to the system that the ram cannot close, as indicated at step 216. Similarly, if the ram fails to open in response to a command to actuate the ram to an open position, the system may also trigger the alarm. The alarm may include audio and/or visual indicators. Returning to decision logic 214, if the device does reach the desired position, no alarm is triggered and the system continues normal operation, as indicated at step 218. While the cause of alarm conditions may vary, this process 208 provides a mechanism that readily alerts the system (and thus those in charge of operating the system) in the event of any abnormal behavior.

Accordingly, an operator may assess the situation based on the alarm and, if necessary, temporarily shut down the system for maintenance or repair procedures. As will be appreciated, the embodiments of the ranging system described herein may operate based on closed-loop or open-loop control. Further, the system may provide for not only control of the position of a particular device, but also the velocity at which the device is actuated when being translated to a desired position. For instance, in the case of a ram in a blowout preventer being actuated from an open to a closed position, the ram's movement may be controlled such that it initially moves relatively quickly and slows down as it approaches a pipe within the wellbore.

Figure 16:
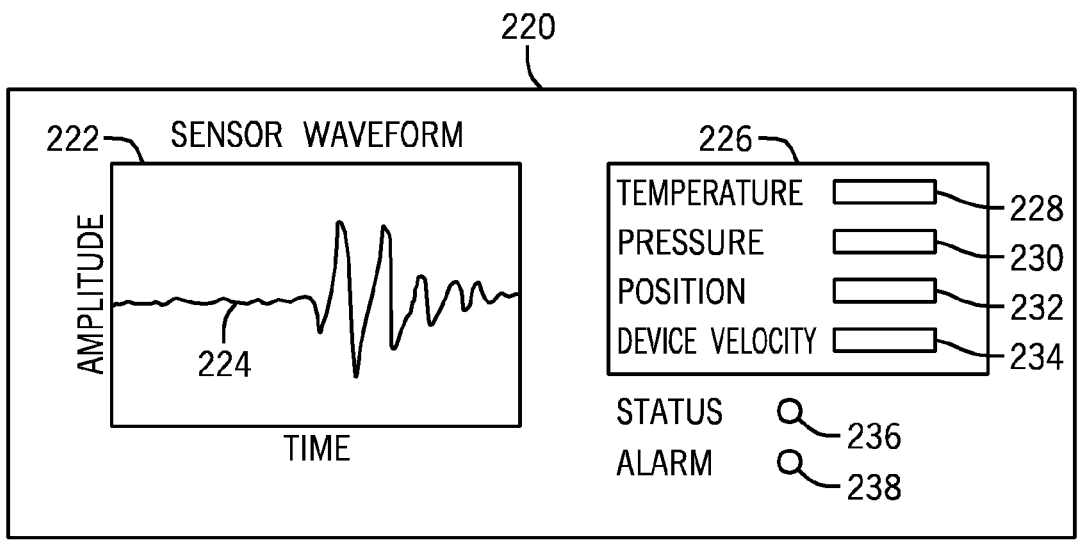
FIG. 16 shows an example of a graphical user interface element that may be displayed for monitoring the operation of a device for which position information is acquired using an ultrasonic position sensor in accordance with aspects of the present disclosure.

FIG. 16 shows an example of a graphical user interface (GUI) element 220 that may be part of the ranging system 36. This GUI element 220 may be displayed on, for example, a workstation located at the surface of the resource extraction system 10 or at a remote location in communication with the resource extraction system 10. The GUI element 220 includes a window 222 that may display the waveform 224 of a signal corresponding to a given sensor 34. With respect to the device being monitored by the sensor 34, the window 226 displays various parameters, including temperature (field 228), pressure (field 230), device position (field 232), as well as the velocity of the device when moving (field 234).

The GUI element 220 also includes indicators 236 and 238. Indicator 236 is a status indicator, which may be configured to indicate if the monitored device is moving. For example, a device that is moving or being actuated may cause the indicator to display a particular color (e.g., green) while a device that is not moving or being actuated may cause the indicator to display another color (e.g., red). The indicator 238 is an alarm condition indicator. For instance, if an alarm condition is detected, the indicator may display one color or, if no alarm condition is present, the indicator may display another color. As can be appreciated, this visual alarm indicator may be provided in conjunction with an audible alarm indicator (e.g., by a speaker or other suitable sound emitting device) connected to the workstation. Further, it should be understood that the ranging system 36 may be configured to monitor data from multiple sensors monitoring various devices within the system. As such, each sensor may have associated with it a respective GUI element 220 for displaying such information.

The ultrasonic position sensing system and techniques described herein may provide position information that is substantially as accurate as position information obtained using other existing solutions, such as position monitoring using LVDTs or other electromechanical position sensors. However, as discussed above, the ultrasonic position sensing system integrates much more easily with existing subsea components and does not require substantial and complex redesign of existing equipment. Further, as the ultrasonic position sensors 34 described herein are generally not subject to common-mode failure mechanisms, as is the case with some electromechanical position sensors, the position information obtained by the ultrasonic position sensing system may better maintain its accuracy over time.

The position information obtained using the presently described ultrasonic position sensing techniques may also provide for some degree of condition monitoring. For instance, linearly actuated devices may have an expected operational wear profile, which describes how the devices are expected to behave as they gradually wear over time. By having access to accurate position information obtained using ultrasonic position sensors 34, an operator may monitor the condition of such linear moving devices over time. For instance, if the distance traveled by a ram of a blowout preventer that has been in operation for a given amount of time in response to a certain amount of actuation pressure falls within an expected range, it may be concluded that the blowout preventer is functioning normally in accordance with its wear profile. However, a distance traveled in response to the same actuation pressure that is less than or greater than the expected range may signal that the blowout preventer may need to be serviced or replaced.

While the examples described above have focused on the use of an ultrasonic position sensor for monitoring the position of a ram of a blowout preventer, it should be appreciated the above-described techniques may be applicable to generally any device or component of a system that moves, such as in response to actuation. For example, in the context of the oilfield industry, other types of components having linearly actuated devices that may be monitored using the ultrasonic ranging techniques described herein include blowout preventer gate valves, wellhead connectors, a lower marine riser package connector, blowout preventer choke and kill valves and connecters, subsea tree valves, manifold valves, process separation valves, process compression valves, and pressure control valves, to name but a few. Additionally, as discussed above, components that move non-linearly may also be monitored using the position sensing techniques described above.

Figure 17:
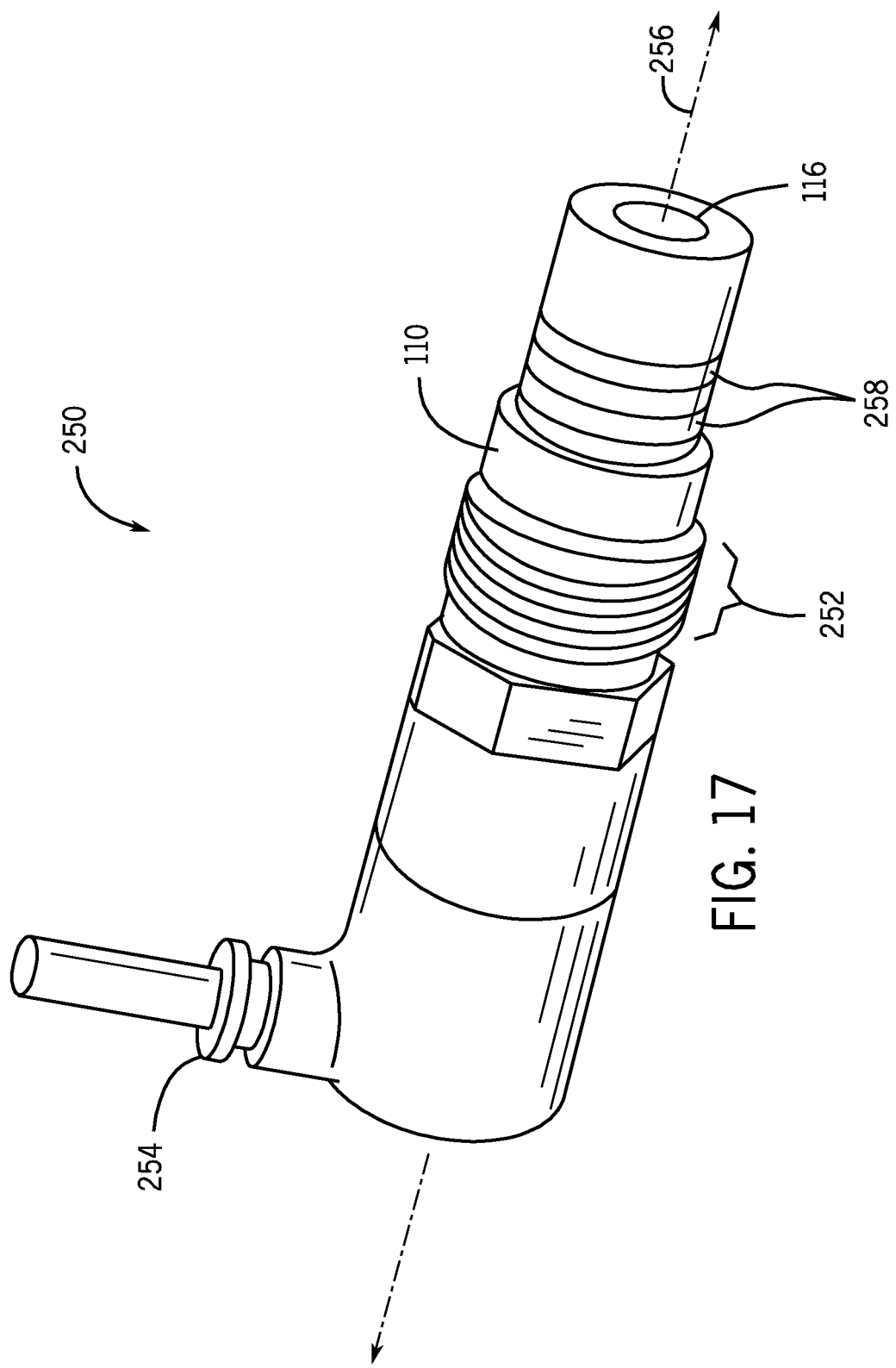
FIG. 17 depicts an ultrasonic position sensing device that may be installed in a subsea device in accordance with a further embodiment.
Figure 18:
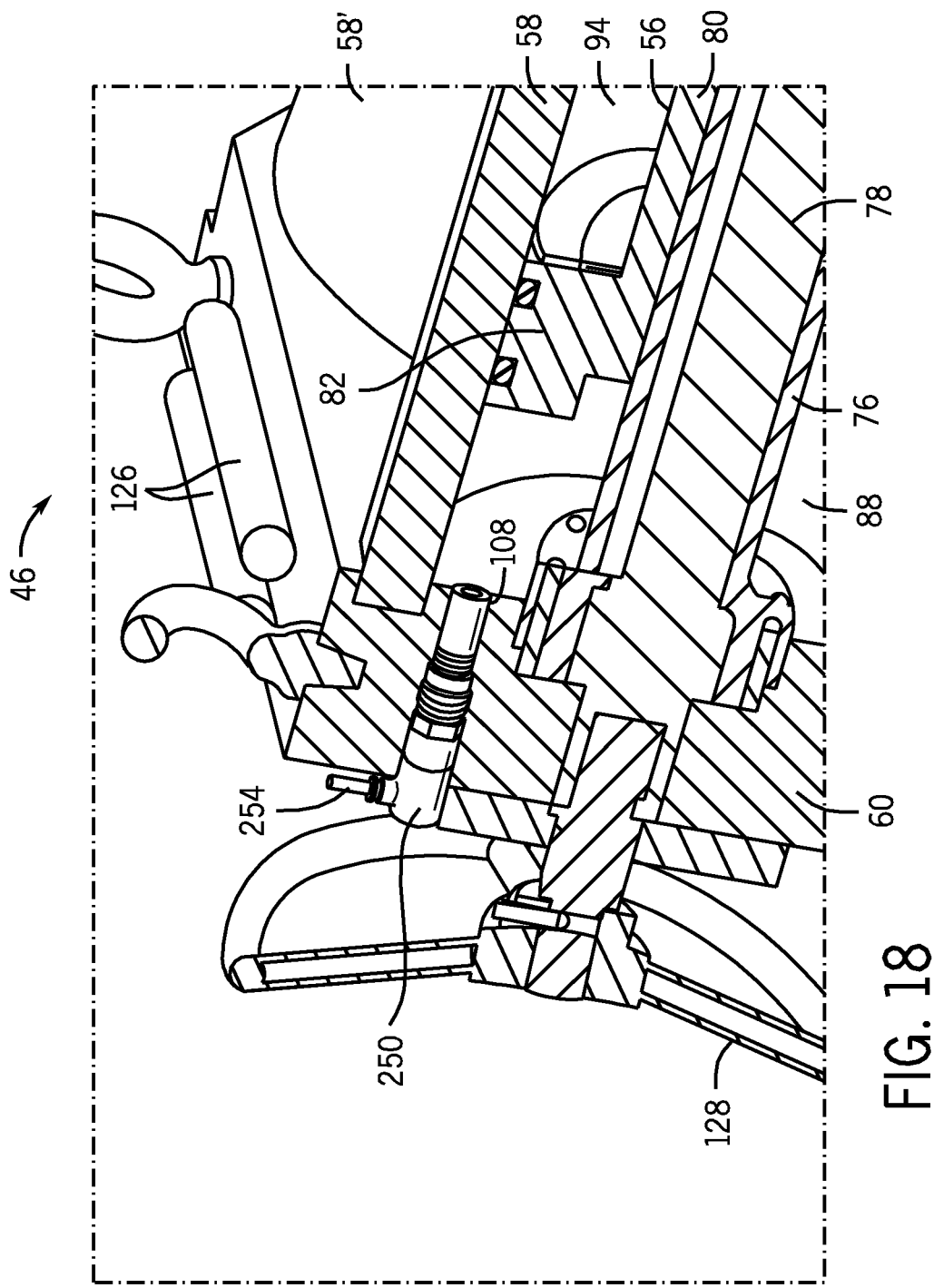
FIG. 18 is a cross-sectional perspective view showing the ultrasonic position sensing device of FIG. 17 installed in the actuator assembly of a blowout preventer in accordance with aspects of the present disclosure.

FIGS. 17 and 18 illustrate another embodiment of an ultrasonic position sensing device, referred to here by reference number 250, which may be used for position monitoring in a subsea device, such as the ram-type blowout preventer shown in FIG. 18. Components of the blowout preventer that have already been described above with reference to FIGS. 3 to 7 are labeled with like reference numbers. Here, rather than including a recess 108 and an opening 118 for wiring, the sensor body 110 may extend through the entire length of the head 60, as best shown in FIG. 18. Thus, in the present embodiment, what was previously a recess 108 in FIG. 7 has been extended all the way through the head 60 to form an opening therein. This opening 108 may include threads for engaging corresponding threads 252 on the sensor body 110. Thus, the sensor 250 may be installed in the opening 108 by rotating the body 110 within the opening 108 until the threads engage. In this embodiment, the sensor housing 110 may be formed using an austenitic nickel-chromium-based superalloy, such as Inconel 718, available from Special Metals Corporation of New Hartford, N.Y.

As shown best in FIG. 17, the sensor may also include one or more o-rings 258 disposed circumferentially about the body 250 between the window 116 and the threads 252. The end of the sensor 250 that protrudes from the outside of the head 60 when installed may include a connector 254. In the illustrated embodiment, the connector 254 may be directed perpendicularly away from the sensor body 110 with respect to a longitudinal axis 256 of the sensor 250. By way of example only, the connector 254 may be a model of a Dry-Mate Submersible Connector, available from Teledyne Technologies Inc. of Thousand Oaks, Calif. Accordingly, wiring for connecting the sensor 250 to the ranging logic 36 may be connected to the sensor 250 via the connector 254. This embodiment of the sensor 250 is an example of one in which the sensor 250 may be installed from the outside of the blowout preventer 32, as mentioned above with reference to FIG. 6.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A position sensor comprising:
a sensor housing configured to be installed on a component having at least one device being monitored by the position sensor; and
a transducer module having a piezoelectric material, a window comprising a plastic material, and a temperature sensing device, wherein the transducer module is configured to be disposed within the sensor housing, to transmit an ultrasonic signal through the window and through a fluid medium toward a surface of the device being monitored, to receive a reflection of the ultrasonic signal from the surface of the device, and to transmit an electrical signal corresponding to the ultrasonic signal to processing logic configured to calculate the velocity of the ultrasonic signal as a function of pressure and temperature and to use the calculated velocity to calculate the distance between the position sensor and the device as a function of the velocity of the ultrasonic signal.

2. The position sensor of claim 1, comprising a connector coupled to the sensor housing, wherein the connector is configured to electronically couple the transducer module to the processing logic.

3. The position sensor of claim 2, wherein the temperature sensing device is configured to determine the temperature of the fluid medium and to provide the temperature to the processing logic via the connector.

4. The position sensor of claim 1, wherein the plastic material comprises at least one of a polyetherimide, organic polymer thermoplastic, or a polyimide-based plastic.

5. The position sensor of claim 1, wherein the piezoelectric material comprises lead zirconate titanate.

6. The position sensor of claim 1, comprising an alumina wear plate interposed between the piezoelectric material and the window.

7. The position sensor of claim 1, wherein the transducer module comprises a plastic casing in which the piezoelectric material is disposed, and wherein the plastic casing is configured to be enclosed within the sensor housing.

8. The position sensor of claim 1, wherein the sensor housing comprises a metal, alloy, or super-alloy, configured to allow the position sensor to operate at pressures of between 14 pounds per square inch (PSI) to 14,000 PSI.

9. A method for determining the position of a component configured for movement comprising:
using a first ultrasonic position sensor to transmit a first ultrasonic signal through a fluid medium to a reference point, wherein a first distance between the first ultrasonic position sensor and the reference point is generally constant;
measuring the round-trip transit time of the first ultrasonic signal between the first ultrasonic position sensor and the reference point;
determining the acoustic velocity of the first ultrasonic signal through the fluid medium based upon the first distance and the round-trip transit time;
using a second ultrasonic position sensor to transmit a second ultrasonic signal through the fluid medium to a surface of the component;
measuring the round-trip transit time of the second ultrasonic signal between the second ultrasonic position sensor and the surface of the component; and
determining a second distance between the second ultrasonic position sensor and the surface of the component based upon the measured round-trip transit time of the second ultrasonic signal and the acoustic velocity of the first ultrasonic signal, the second distance being indicative of the location of the component relative to the position of the second ultrasonic position sensor.

10. The method of claim 9, wherein the first ultrasonic position sensor and the second ultrasonic position sensor are oriented perpendicularly with respect to each other.

11. The method of claim 9, wherein the reference point comprises another surface of the component, wherein the distance between the other surface of the component and the first ultrasonic sensor remains generally constant even when the component is moving.

12. The method of claim 11, wherein the component comprises a piston, wherein the surface of the piston toward which the second ultrasonic signal is transmitted is a flange of the piston and wherein the surface of the piston towards which the first ultrasonic signal is transmitted is a shaft of the piston.

13. The method of claim 12, wherein the piston is a component of a blowout preventer of a resource extraction system.

* * * * *